(12) United States Patent
Nair et al.

(10) Patent No.: US 8,640,098 B2
(45) Date of Patent: Jan. 28, 2014

(54) OFFLINE CONFIGURATION AND DOWNLOAD APPROACH

(75) Inventors: Ajay Nair, Bangalore (IN); Jerry Marti, West Salem, OH (US)

(73) Assignee: Honeywell International Inc., Morristown, NJ (US)

( * ) Notice: Subject to any disclaimer, the term of this patent is extended or adjusted under 35 U.S.C. 154(b) by 669 days.

(21) Appl. No.: 12/722,364

(22) Filed: Mar. 11, 2010

(65) Prior Publication Data

US 2011/0225580 A1    Sep. 15, 2011

(51) Int. Cl.
*G06F 9/44* (2006.01)

(52) U.S. Cl.
USPC ........... 717/121; 717/122; 717/124; 717/125; 717/126

(58) Field of Classification Search
None
See application file for complete search history.

(56) References Cited

U.S. PATENT DOCUMENTS

| | | |
|---|---|---|
| 4,375,637 A | 3/1983 | Desjardins |
| 4,816,208 A | 3/1989 | Woods et al. |
| 5,042,265 A | 8/1991 | Baldwin et al. |
| 5,161,387 A | 11/1992 | Metcalfe et al. |
| 5,385,297 A | 1/1995 | Rein et al. |
| 5,390,206 A | 2/1995 | Rein et al. |
| 5,544,036 A | 8/1996 | Brown, Jr. et al. |
| 5,768,119 A | 6/1998 | Havekost et al. |
| 5,929,761 A | 7/1999 | Van der Laan et al. |
| 5,946,303 A | 8/1999 | Watson et al. |
| 5,955,946 A | 9/1999 | Beheshti et al. |
| 6,124,790 A | 9/2000 | Golov et al. |
| 6,141,595 A | 10/2000 | Gloudeman et al. |
| 6,178,362 B1 | 1/2001 | Woolard et al. |
| 6,185,483 B1 | 2/2001 | Drees |
| 6,195,309 B1 | 2/2001 | Ematrudo |
| 6,223,544 B1 | 5/2001 | Seem |
| 6,295,527 B1 | 9/2001 | McCormack et al. |
| 6,314,328 B1 | 11/2001 | Powell |
| 6,351,213 B1 | 2/2002 | Hirsch |
| 6,356,282 B2 | 3/2002 | Roytman et al. |
| 6,389,464 B1 | 5/2002 | Krishnamurthy et al. |
| 6,420,968 B1 | 7/2002 | Hirsch |
| 6,430,712 B2 | 8/2002 | Lewis |

(Continued)

FOREIGN PATENT DOCUMENTS

| | | |
|---|---|---|
| WO | WO 01/97146 | 12/2001 |
| WO | WO 02/052432 | 7/2002 |

(Continued)

OTHER PUBLICATIONS

R. L. McCown et al., APSIM a Novel Software System for Model Development Model Testing and Simulation in Agricultural Systems Research, 1996 Elsevier, pp. 255-271, <http://ac.els-cdn.com/0308521X9400055V/1-s2.0-0308521X9400055V-main.pdf?>.*

(Continued)

*Primary Examiner* — Thuy Dao
*Assistant Examiner* — Cuong V Luu
(74) *Attorney, Agent, or Firm* — Seager, Tufte & Wickhem, LLC.

(57) ABSTRACT

A system for creating a station having a configuration and making the station active within a supervisor application without a need of actual site controller hardware. The configuration may be changed. The new station may be downloaded with the changed configuration to a site controller. Multiple steps for effecting the present configuration design and station download may automatically be accomplished by fewer steps.

16 Claims, 25 Drawing Sheets

(56) References Cited

U.S. PATENT DOCUMENTS

| | | | |
|---|---|---|---|
| 6,466,654 B1 | 10/2002 | Cooper et al. | |
| 6,473,407 B1 | 10/2002 | Ditmer et al. | |
| 6,492,901 B1 | 12/2002 | Ridolfo | |
| 6,535,122 B1 | 3/2003 | Bristol | |
| 6,549,135 B2 | 4/2003 | Singh et al. | |
| 6,643,355 B1 | 11/2003 | Tsumpes | |
| 6,675,591 B2 | 1/2004 | Singh et al. | |
| 6,681,156 B1 | 1/2004 | Weiss | |
| 6,690,980 B2 | 2/2004 | Powell | |
| 6,813,587 B2 | 11/2004 | McIntyre et al. | |
| 6,816,811 B2 | 11/2004 | Seem | |
| 6,832,120 B1 | 12/2004 | Frank et al. | |
| 6,870,141 B2 | 3/2005 | Damrath et al. | |
| 6,879,253 B1 | 4/2005 | Thuillard | |
| 6,892,546 B2 | 5/2005 | Singh et al. | |
| 6,919,809 B2 | 7/2005 | Blunn et al. | |
| 6,947,972 B2 | 9/2005 | Chun | |
| 6,955,302 B2 | 10/2005 | Erdman, Jr. | |
| 6,973,627 B1 | 12/2005 | Appling | |
| 6,990,821 B2 | 1/2006 | Singh et al. | |
| 7,009,510 B1 | 3/2006 | Douglass et al. | |
| 7,024,283 B2 | 4/2006 | Bicknell | |
| 7,031,880 B1 | 4/2006 | Seem et al. | |
| 7,062,389 B2 | 6/2006 | Johnson et al. | |
| 7,068,931 B2 | 6/2006 | Tokunaga | |
| 7,069,181 B2 | 6/2006 | Jerg et al. | |
| 7,085,674 B2 | 8/2006 | Iwasawa | |
| 7,113,085 B2 | 9/2006 | Havekost | |
| 7,171,287 B2 | 1/2007 | Weiss | |
| 7,183,907 B2 | 2/2007 | Simon et al. | |
| 7,243,044 B2 | 7/2007 | McCalla | |
| 7,250,856 B2 | 7/2007 | Havekost et al. | |
| 7,272,452 B2 | 9/2007 | Coogan et al. | |
| 7,277,018 B2 | 10/2007 | Reyes et al. | |
| 7,320,023 B2 | 1/2008 | Chintalapati et al. | |
| 7,345,580 B2 | 3/2008 | Akamatsu et al. | |
| 7,379,997 B2 | 5/2008 | Ehlers et al. | |
| 7,428,726 B1* | 9/2008 | Cowan et al. | 717/122 |
| 7,457,869 B2 | 11/2008 | Kernan | |
| 7,460,020 B2 | 12/2008 | Reyes et al. | |
| 7,490,319 B2* | 2/2009 | Blackwell et al. | 717/124 |
| 7,565,225 B2 | 7/2009 | Dushane et al. | |
| 7,596,613 B2 | 9/2009 | Silverthorne et al. | |
| 7,644,371 B2 | 1/2010 | Robertson et al. | |
| 7,653,459 B2 | 1/2010 | Pouchak et al. | |
| 7,703,073 B2* | 4/2010 | Illowsky et al. | 717/121 |
| 7,734,572 B2 | 6/2010 | Wiemeyer et al. | |
| 7,774,457 B1 | 8/2010 | Talwar et al. | |
| 7,819,334 B2 | 10/2010 | Pouchak et al. | |
| 7,870,090 B2 | 1/2011 | McCoy et al. | |
| 7,904,186 B2 | 3/2011 | Mairs et al. | |
| 7,941,786 B2* | 5/2011 | Scott et al. | 717/121 |
| 8,090,477 B1 | 1/2012 | Steinberg | |
| 8,146,060 B2* | 3/2012 | Lekel | 717/125 |
| 8,190,273 B1 | 5/2012 | Federspiel et al. | |
| 8,218,570 B2 | 7/2012 | Moran et al. | |
| 8,224,466 B2 | 7/2012 | Wacker | |
| 8,225,292 B2* | 7/2012 | Naslavsky et al. | 717/126 |
| 8,335,593 B2 | 12/2012 | Johnson et al. | |
| 8,341,599 B1* | 12/2012 | Angalet et al. | 717/121 |
| 8,352,047 B2 | 1/2013 | Walter | |
| 8,527,947 B2* | 9/2013 | Clemm | 717/121 |
| 2002/0152298 A1 | 10/2002 | Kikta et al. | |
| 2003/0009754 A1* | 1/2003 | Rowley et al. | 717/177 |
| 2003/0078677 A1 | 4/2003 | Hull et al. | |
| 2003/0101009 A1 | 5/2003 | Seem | |
| 2003/0171851 A1 | 9/2003 | Brickfield et al. | |
| 2004/0143510 A1 | 7/2004 | Haeberle et al. | |
| 2004/0230328 A1 | 11/2004 | Armstrong et al. | |
| 2005/0038571 A1 | 2/2005 | Brickfield et al. | |
| 2005/0043862 A1 | 2/2005 | Brickfield et al. | |
| 2005/0143863 A1 | 6/2005 | Ruane et al. | |
| 2005/0166094 A1* | 7/2005 | Blackwell et al. | 714/38 |
| 2005/0193285 A1 | 9/2005 | Jeon | |
| 2005/0222889 A1 | 10/2005 | Lai et al. | |
| 2005/0230490 A1 | 10/2005 | Pouchak et al. | |
| 2006/0038672 A1 | 2/2006 | Schoettle | |
| 2006/0064305 A1 | 3/2006 | Alonso | |
| 2006/0136558 A1 | 6/2006 | Sheehan et al. | |
| 2006/0168013 A1 | 7/2006 | Wilson et al. | |
| 2006/0253205 A1 | 11/2006 | Gardiner | |
| 2007/0198674 A1* | 8/2007 | Li et al. | 709/223 |
| 2008/0010049 A1 | 1/2008 | Pouchak et al. | |
| 2008/0015739 A1 | 1/2008 | Wacker | |
| 2008/0016493 A1 | 1/2008 | Pouchak et al. | |
| 2008/0086720 A1* | 4/2008 | Lekel | 717/124 |
| 2008/0115153 A1 | 5/2008 | Brindle | |
| 2008/0125914 A1 | 5/2008 | Wacker | |
| 2008/0189162 A1 | 8/2008 | Ganong et al. | |
| 2009/0113037 A1 | 4/2009 | Pouchak | |
| 2010/0100583 A1 | 4/2010 | Pouchak | |
| 2010/0106543 A1 | 4/2010 | Marti | |
| 2010/0131653 A1 | 5/2010 | Dharwada et al. | |
| 2010/0131877 A1 | 5/2010 | Dharwada et al. | |
| 2010/0198651 A1 | 8/2010 | Johnson et al. | |
| 2010/0286937 A1 | 11/2010 | Hedley et al. | |
| 2010/0287130 A1 | 11/2010 | Guralnik et al. | |
| 2011/0010654 A1 | 1/2011 | Raymond et al. | |
| 2011/0083077 A1 | 4/2011 | Nair et al. | |
| 2011/0093493 A1 | 4/2011 | Nair et al. | |
| 2011/0098863 A1 | 4/2011 | Miki | |
| 2011/0113360 A1 | 5/2011 | Johnson et al. | |
| 2012/0005731 A1* | 1/2012 | Lei et al. | 726/6 |
| 2012/0084660 A1 | 4/2012 | Nair et al. | |
| 2012/0084696 A1 | 4/2012 | Marti | |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Peter S. Magnusson et al., Simics A Full System Simulation Platform, 2002 IEEE, pp. 50-58, <http://ieeexplore.ieee.org/stamp/stamp.jsp?tp=&arnumber=982916>.*

Edward H. Bersoff et al., Impacts of life cycle models on software, 1991 ACM, pp. 104-118, <http://dl.acm.org/citation.cfm?id=108537>.*

Luca Benini et al., Cycle-Accurate Simulation of Energy Consumption in Embedded Systems, 1999 ACM, pp. 867-872, <http://dl.acm.org/citation.cfm?id=310090>.*

Edward A. Lee et al., A hardware software codesign methodology for DSP applications, 1993 IEEE, pp. 16-28, <http://ieeexplore.ieee.org/stamp/stamp.jsp?tp=&arnumber=232469>.*

Roger S. Pressman, Software Engineering A Practitioner's Approach, 1992 Gudeforengineers.com, 67 pages, <http://guideforengineers.com/wordpress/wp-content/uploads/2009/10/se_notes.pdf>.*

Honeywell, "Excel Building Supervisor-Integrated R7044 and FS90 Ver. 2.0," Operator Manual, 70 pages, Apr. 1995.

Trane, "System Programming, Tracer Summit Version 14, BMTW-SVP01D-EN," 246 pages, 2002.

Adobe Acrobat 6.0 Standard, Version 6.0.2, Screenshots, 2 pages, May 18, 2004.

U.S. Appl. No. 12/643,865, filed Dec. 21, 2009.
U.S. Appl. No. 12/703,476, filed Feb. 10, 2010.
U.S. Appl. No. 12/792,547, filed Jun. 2, 2010.
U.S. Appl. No. 12/822,997, Jun. 24, 2010.
U.S. Appl. No. 12/977,701, filed Dec. 23, 2010.

http://blogs.msdn.com/b/khen1234/archive/2005/05/11/416392.aspx, "Regular Expressions in T-SQL," 4 pages, May 11, 2005.

(56) References Cited

OTHER PUBLICATIONS http://www.google.com/maps, "Google Maps, Pin Location," 1 page, prior to Nov. 21, 2008.
Microsoft Word Screen Shots, 2 pages, prior to Nov. 21, 2008.
http://en.wikipedia.org/wiki/JAR_(file_format), "JAR (file Format)—Wikipedia, the Free Encyclopedia," 3 pages, printed Dec. 26, 2009.
Honeywell Spyder Bacnet User's Guide, 242 pages, Revised Jul. 2009.
Honeywell Spyder User's Guide 202 pages, Released Jul. 2007.
Siemens, BACnet for DESIGO 27 Pages, prior to Dec. 30, 2009.
Tridium, "Tridium & Niagara Framework Overview," 9 pages, prior to Oct. 28, 2008.
Tridium, "NiagaraAX Product Model Overview," 7 pages, 2005.
Atere-Roberts et al., "Implementation of a Computerized Maintenance Management System for the City of Atlanta," 13 pages, Proceedings of the Water Environment Federation, Jan. 1, 2002.
Business Objects, Crystal Reports Acess, Format, and Integrate Data, 4 pages, Dec. 2003.
U.S. Appl. No. 13/402,780, filed Feb. 22, 2012.
U.S. Appl. No. 13/657,620, filed Oct. 22, 2012.
Honeywell, "ComfortPoint Open BMS Release 100," Specification and Technical Data, 13 pages, Jun. 2012.
Honeywell, "Excel 15B W7760B Building Manager," User's Guide, 84 pages, Revised Jan. 2005.
http://www.de2m.com/DE2R_Technical.html, "Data Enabled Enterprise Repository (DE2R) Technical Overview," 4 pages, printed Mar. 8, 2013.
Johnson Controls, "Fx Workbench, User's Guide," 818 pages, issued May 19, 2008, (this article will be uploaded to USPTO website in 5 parts).
Novar, "Opus Supervisor User Guide," pp. 1-159, Feb. 1, 2012.
Novar, "Demand Response, Program Implementation and Execution," 8 pages, Oct. 28, 2008.
Novar, "Media Backgrounder," 10 pages, prior to Feb. 22, 2012.

\* cited by examiner

OFFLINE CONFIGURATION AND DOWNLOAD APPROACH

The present application is related to U.S. patent application Ser. No. 12/260,046, filed Oct. 28, 2008, entitled "A Building Management Configuration System". U.S. patent application Ser. No. 12/260,046, filed Oct. 28, 2008, is hereby incorporated by reference. The present application is also related to U.S. patent application Ser. No. 12/703,476, filed Feb. 10, 2010, entitled "A Multi-Site Controller Batch Update System"; and U.S. patent application Ser. No. 12/643,865, filed Dec. 21, 2009, entitled "Approaches for Shifting a Schedule"; all of which are hereby incorporated by reference.

BACKGROUND

The invention pertains to software and controllers and particularly to controller configurations. More particularly, the invention pertains to configuration designing.

SUMMARY

The invention is an approach for creating a station with a configuration and making it active within a supervisor application without a need of actual site controller hardware. The configuration may be changed. The new station may be downloaded to a site controller. The approach may automate multiple steps into one or more sequences of operations.

DESCRIPTION

Figure 1:
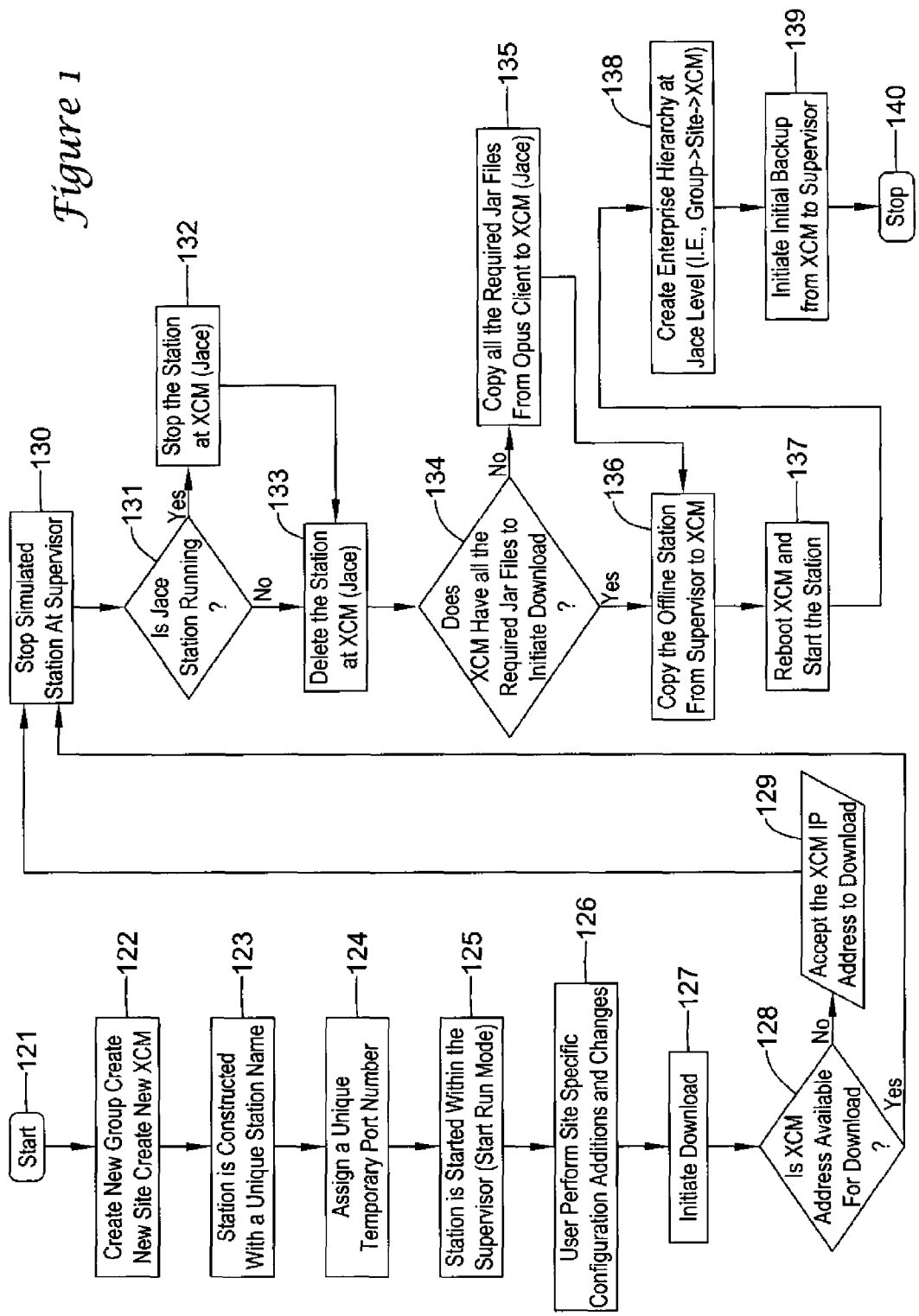
FIG. 1 is a flow diagram for an offline configuration and download approach.

The Tridium™ (Tridium) NiagaraAX™ (NiagaraAX, Niagara) Framework™ (framework) may particularly be a base software application or approach for developing a site offline configuration and download feature. The feature may capture improvements made to an existing Niagara Workbench™ (workbench) user interface application to provide the customer a desired user experience in creating controller configurations and deploying them to site controllers.

The Novar™ (Novar) Opus™ (Opus) Supervisor™ (supervisor) may provide a basis of the present application or approach. The framework may generally be a software platform for integrating diverse systems and devices regardless of manufacturers, or communication protocols into a unified platform which can be managed and controlled in real time over an internet using a standard web browser. The supervisor may be a software platform built on the framework. The supervisor may communicate with site controllers via an intranet or internet. A site controller may be referred to as an XCM (executive control module) controller (XCM).

The supervisor may serve real-time graphical information displays to standard web-browser clients and provide server-level functions such as centralized data logging, archiving, alarming, real-time graphical displays, master scheduling, system-wide database management, and integration with Novar Enterprise™ (enterprise) software. The enterprise software family may be used for energy analysis and business-critical requirements such as alarm handling, systems configuration, data collection and performance monitoring.

A definition of "creating a site configuration offline" may indicate that a site controller configuration is created and made active within a supervisor application without a need of actual site controller hardware. A customer of a Novar retail business may wish to create a site configuration offline and, when complete, initiate a download of this configuration to a site controller. Upon completion of the download, the customer may want to have a copy of the downloaded site configuration safely backed up within the supervisor. The customer may want these operations to require minimal user interaction with the supervisor application.

The NiagaraAX workbench may be capable of approaches for creating an offline site controller configuration and then deploying it to a remote site controller. However, there are numerous user interactions that may be required to accomplish this task. The present approach may minimize these user interactions by automating multiple steps into sequences of operations.

The following items are individual user manual steps which may be required when using Niagara workbench technology. One may note that the term "supervisor" may be used to refer to the workbench application. The steps may incorporate the following: 1) Use a toolbar option to create a new site controller station baseline configuration within the supervisor; 2) Provide a unique station name based on guidelines using best practices; 3) Provide a unique port number for running within the supervisor; 4) Navigate to an application director view within the supervisor; 5) Select the newly created station and invoke a start command; 6) Connect the workbench to the running station within the supervisor; 7) Perform site specific configuration additions and changes; 8) Change the station to correct a port number for deployment; 9) Stop the station running within the supervisor; 10) Connect the workbench to a site controller platform service; 11) Navigate to the software manager view; 12) Ensure that required jar (Java archive) files are installed and up to date; 13) Navigate to the station copier view; 14) Select the new station to download and initiate a download; 15) Connect the workbench to the newly deployed site controller; and 16) Initiate a backup operation to create a safe archive of the site configuration. This set of steps may be simplified with some of the steps being automatically performed by the present application or approach.

The present application may provide the user an ability to create a logical, hierarchal structure representing the user's business and site deployment structure. A solution for the issue noted herein may be to provide a user friendly, streamlined experience to create and deploy the user's site configurations. Here, the user may perform the following steps: 1) Select a site node and use a right click menu option to create a new site controller station baseline configuration—This user action 1) may accomplish steps 1 through 6 specified for the related application or approach noted herein, by automatically performing the following four sub-steps: a) A unique station name may be constructed from hierarchal component branch names; b) The application may assign a unique temporary port number used while running in a supervisor; c) The station may be started within the supervisor environment; and d) The workbench application may be connected to the running station; step 2) Perform site specific configuration changes which may include additions and deletions—This may be the same user action as step 7 specified for the related application or approach noted herein; 3) Set a site controller IP address into an executive property sheet; 4) Select a new site controller node and use the right click menu option for a download, and to initiate the download—This user action may accomplish steps 8 through 16, specified for the related application or approach noted herein, by automatically performing the following six sub-steps: a) The present application or approach may stop the running station within the supervisor and release the temporary port number; b) The application may connect to the site controller platform service; c) The application may confirm that required jar files are installed; d) The application may perform a station download; e) The application may connect to the newly deployed site controller; and f) The application may perform a backup operation.

The present application or approach may be implemented as part of a "profiled" Niagara workbench. This means that the base workbench may be used as a basis and then extended to provide the desired user features which are needed. The Niagara framework may provide a public application programming interface to allow many of the manual operations to be initiated programmatically. To implement the present application, the application may consolidate the calls to the application program interfaces (API's) into sequences and may be initiated by simple and intuitive menu options.

In the flow diagrams in the present description, various instances of actions may be referred to as steps, blocks, actions, and the like. However, for illustrative purposes, the instances may be referred to as occurring at the symbols in the respective diagrams.

FIG. 1 is a diagram which indicates an overall flow of the present approach. The approach may go from a start place 121 to a symbol 122 where a new group, site and XCM may be created. At symbol 123, a station may be constructed with a unique station name. Additionally, a unique temporary port number may be assigned at symbol 124. The station may be started within a supervisor (i.e., begin a run mode) at symbol 125 to be running. A user may perform site specific configuration additions and changes at symbol 126. Changes may incorporate additions and deletions. At symbol 127, a download may be initiated. A question arises at symbol 128 as to whether an XCM address is available for a download. If the answer is no, then an XCM IP address may be accepted to download at symbol 129 and then go to symbol 130, or if an address is already had then go to symbol 130 where the simulated station is stopped from running (i.e., end the run mode or put into a non-run mode) at the supervisor. Then a question of whether the JACE station is running may be asked at symbol 131. If the answer is yes, then the station may be stopped at the XCM (JACE) as indicated at symbol 132. If the answer is no, then the station may be deleted at the XCM (JACE) at symbol 133. A question at symbol 134 concerns whether the XCM has all of the required JAR files to initiate a download. If not, the all of the required JAR files may be copied from the Opus client to the XCM (JACE) at symbol 135. If the question is yes, then at symbol 136, the offline station may be copied from the supervisor to the XCM. The XCM may be rebooted and the station started at symbol 137. An enterprise hierarchy may be created at the JACE level (i.e., Group->Site->XCM) according to symbol 138. An initial backup may be initiated from the XCM to the supervisor at symbol 139. At symbol 140, the approach may be stopped.

Figure 2:
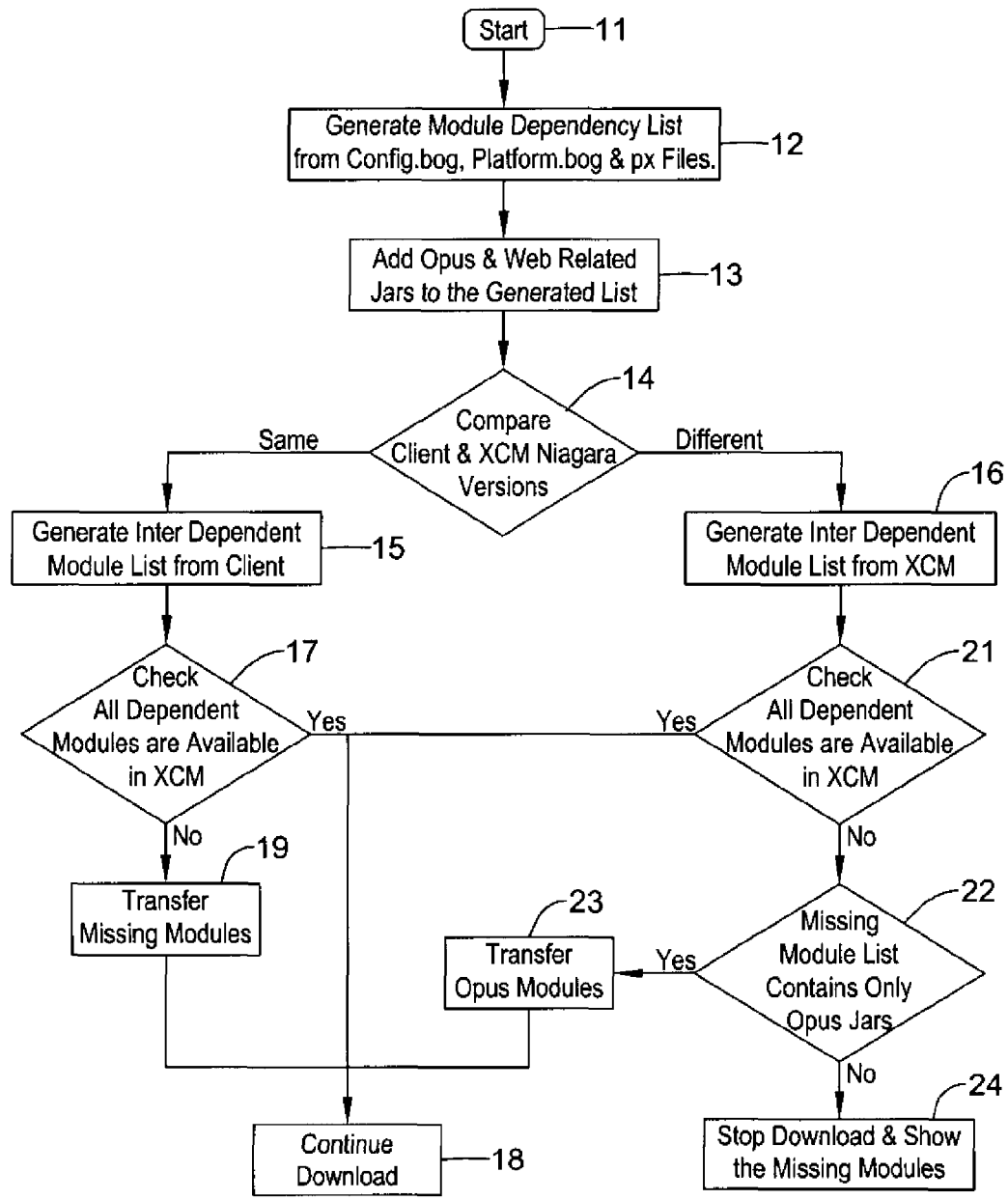
FIG. 2 is a flow diagram of a jar transfer which is one of the features in an offline configuration and download.

FIG. 2 is a flow diagram of a jar transfer approach as it may relate to an offline configuration and download to a site controller. From a start 11, there may be a module dependency list generated from config.Bog, platform.bog and px files at symbol 12. Opus™ (Opus) and Niagara related jars may be added to a generated list at symbol 13. At symbol 14, client and XCM (executive control module) Niagara versions may be compared. If the result of a comparison reveals the versions to be the same, then an inter-dependent module list may be generated from a client at symbol 15. If the result of the comparison reveals the versions to be different, then an inter-dependent module list may be generated from the XCM at symbol 16 and the download may be continued at symbol 18.

After generating an inter-dependent module list from the client at symbol 15, the availability of all of the dependent modules in the XCM may be checked for at symbol 17. If all of the dependent modules are available in the XCM at symbol 17, then the download may be continued at symbol 18. If all of the dependent modules are not available in the XCM at symbol 17, then all the missing modules may be transferred at symbol 19 and on to continue download at symbol 18.

After generating an inter-dependent module list from the XCM at symbol 16, the availability of all of the dependent modules in the XCM may be checked for at symbol 21. If all of the dependent modules are available in the XCM at symbol 21, then the download may be continued at symbol 18. If all of the dependent modules are not available in the XCM at symbol 21, then a question of whether a missing module list contains only Opus jars may be asked at symbol 22. If the answer at symbol 22 is no, then the download may be stopped and the missing modules be shown at symbol 24. If the answer at symbol 22 is yes, then the Opus modules may be transferred at symbol 23 and the download continued at symbol 18.

Figure 3:
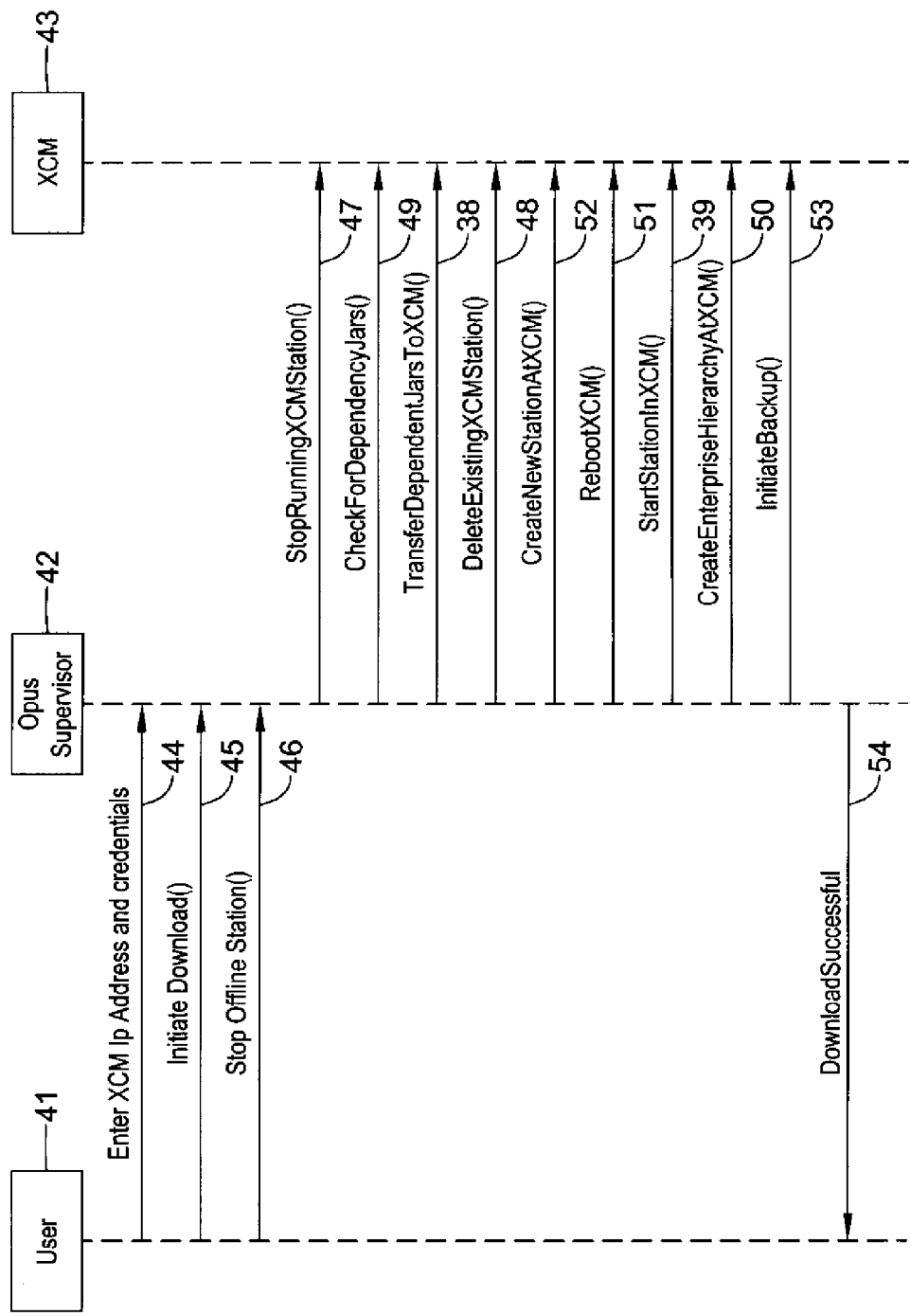
FIG. 3 is a diagram of interaction among a user, a supervisor, and a controller.

FIG. 3 is a diagram of interaction activity of the user 41, Opus supervisor 42 and the XCM 43. User 41 may enter the XCM IP address and credentials at a line 44 and initiate download( ) at a line 45 going from the user 41 to supervisor 42. There may be a stop offline station( ) at line 46 going from user 41 to supervisor 42. From Opus supervisor 42 to XCM 43, the items may include a stop running XCM station( ) at a line 47, a check( ) for dependency jars at line 49, a transfer dependent jars to XCM( ) at line 38, a delete existing XCM station( ) at line 48, a create new station at XCM( ) at line 52, a reboot XCM( ) at line 51, a start station in XCM( ) at line 39, a create enterprise hierarchy at XCM( ) at line 50, and an initial backup( ) at line 53. The Opus supervisor 42 may indicate to user 41 the XCM download as successful( ) at line 54.

Figure 4:
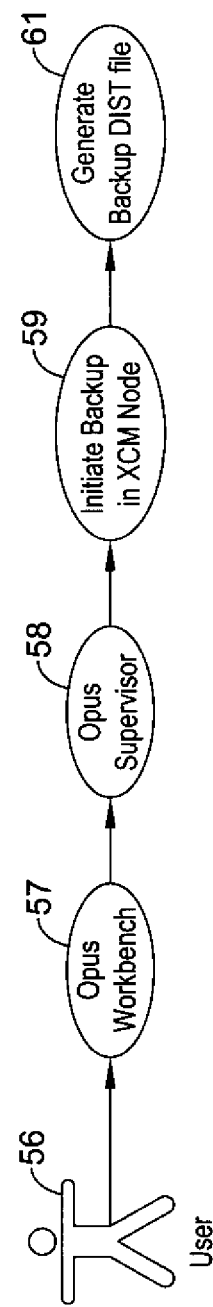
FIG. 4 is a flow diagram of a user's case for a manual backup/restore.

FIG. 4 is a flow diagram of a user's case for a manual backup/restore. A user 56 may go to an Opus workbench 57 and then to an Opus supervisor 58 to initiate a backup in an XCM node at symbol 59. Then a backup dist (distribution) file may be generated at symbol 61.

Figure 5:
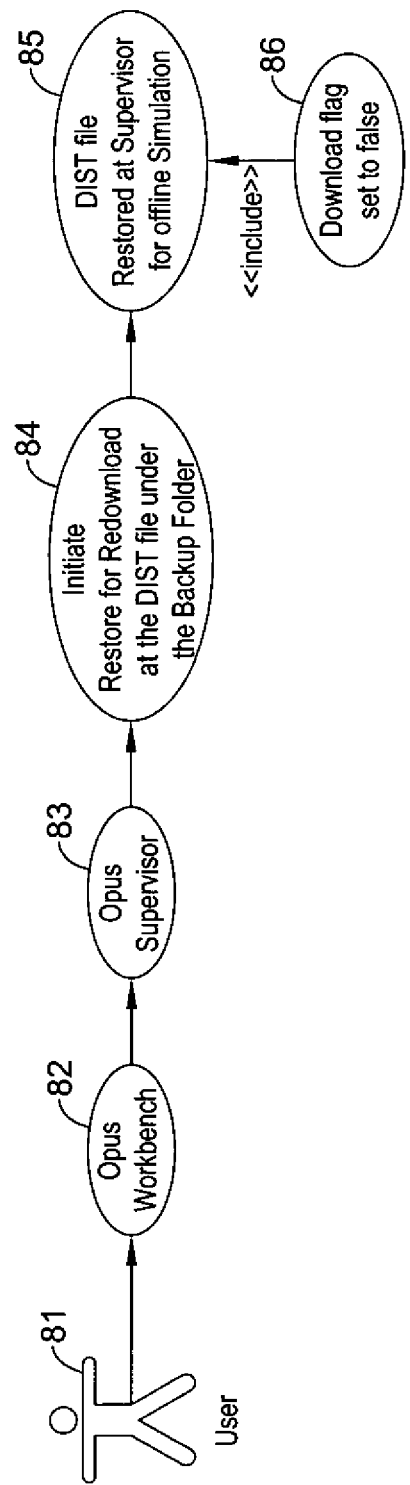
FIG. 5 is a flow diagram of a restore for a redownload.

FIG. 5 is a flow diagram of a restore for a redownload. A user 81 may go to an Opus workbench at symbol 82 and connect to an Opus supervisor at symbol 83. At symbol 84, the user 81 may initiate a restore for a redownload at a dist file under a backup folder. The dist filed may be restored at the supervisor for an offline simulation at symbol 85. A download flag set to false at symbol 86 may be included in the action at symbol 85.

Figure 6:
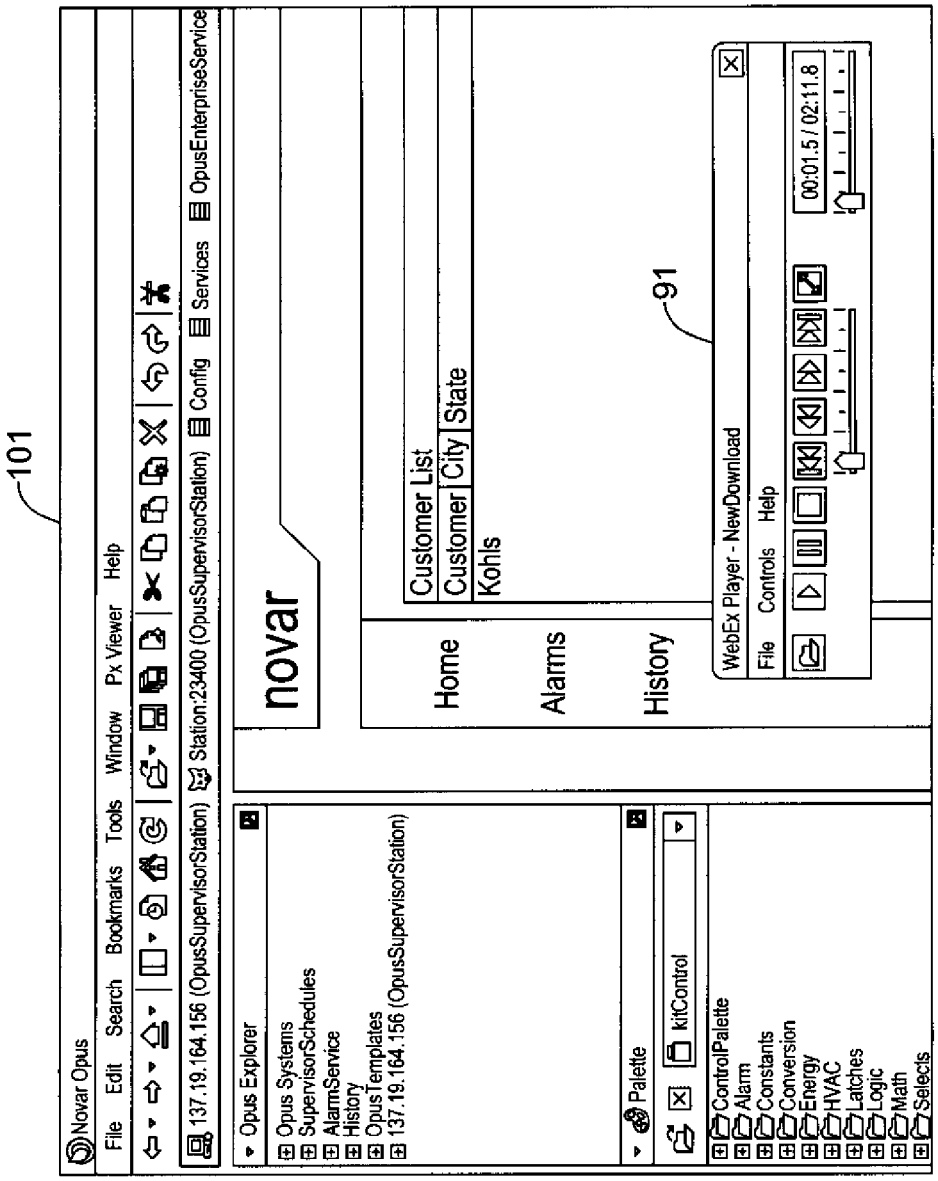
FIGS. 6-25 are diagrams of screen shots showing significant portions of a process of the present application or approach.
Figure 7:
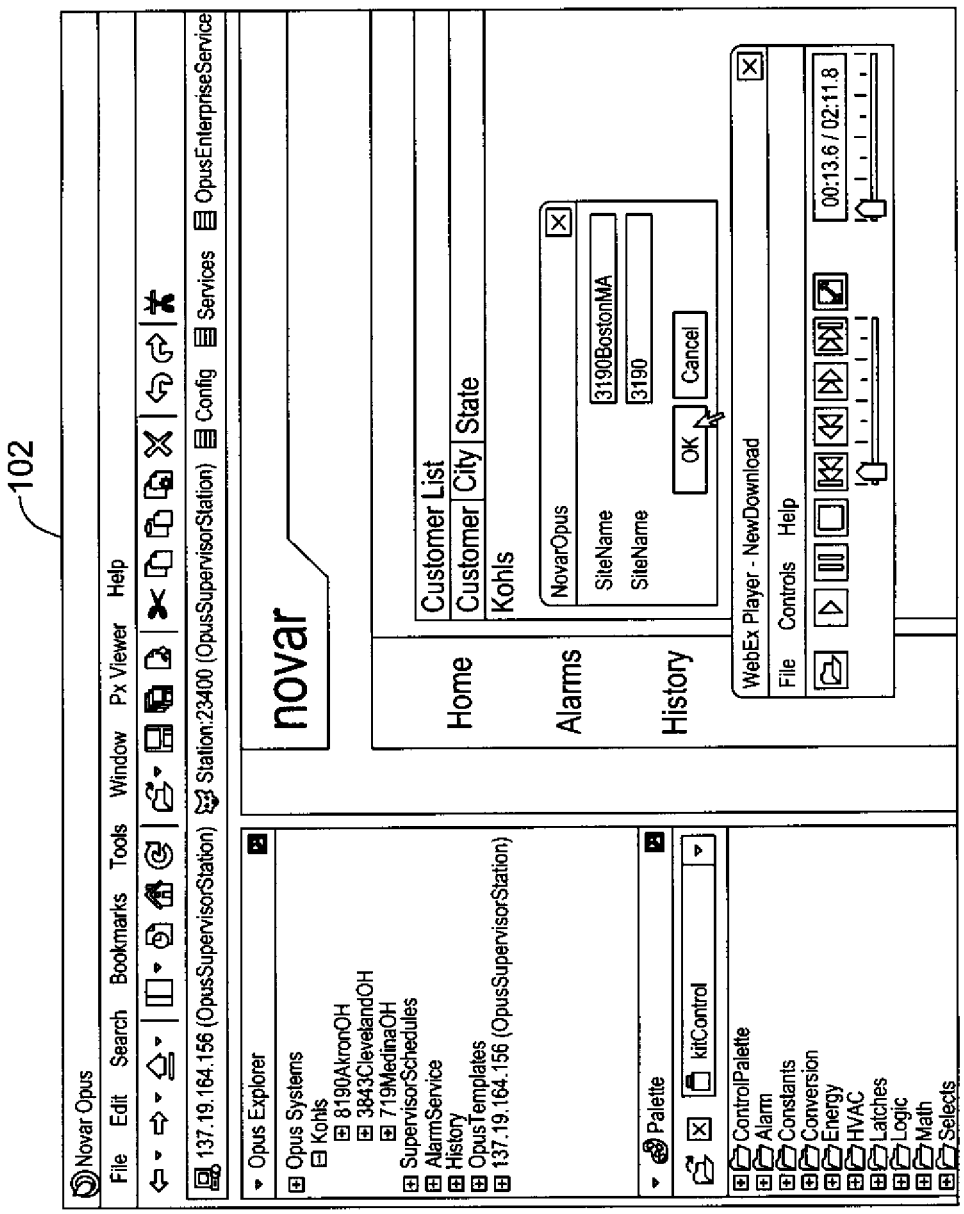
Figure 8:
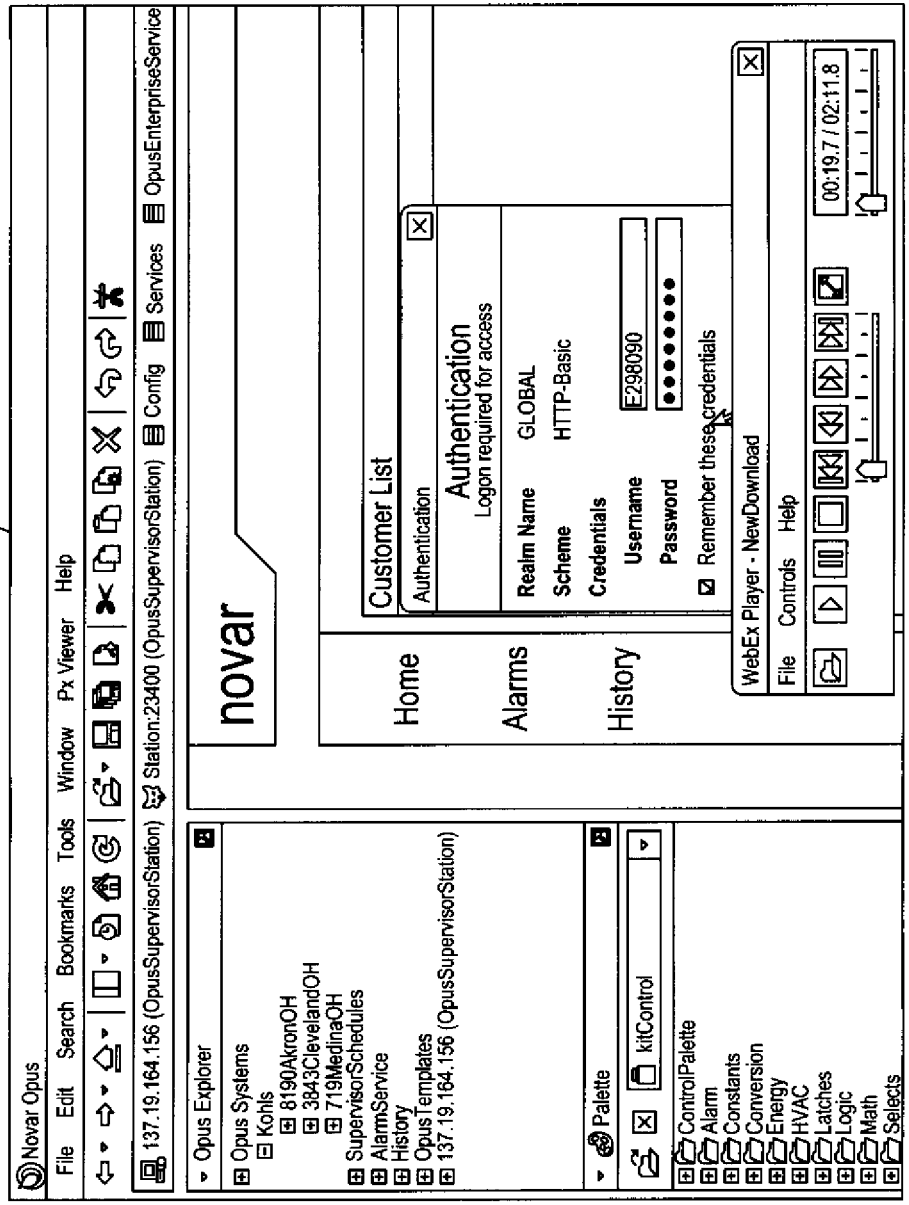
Figure 9:
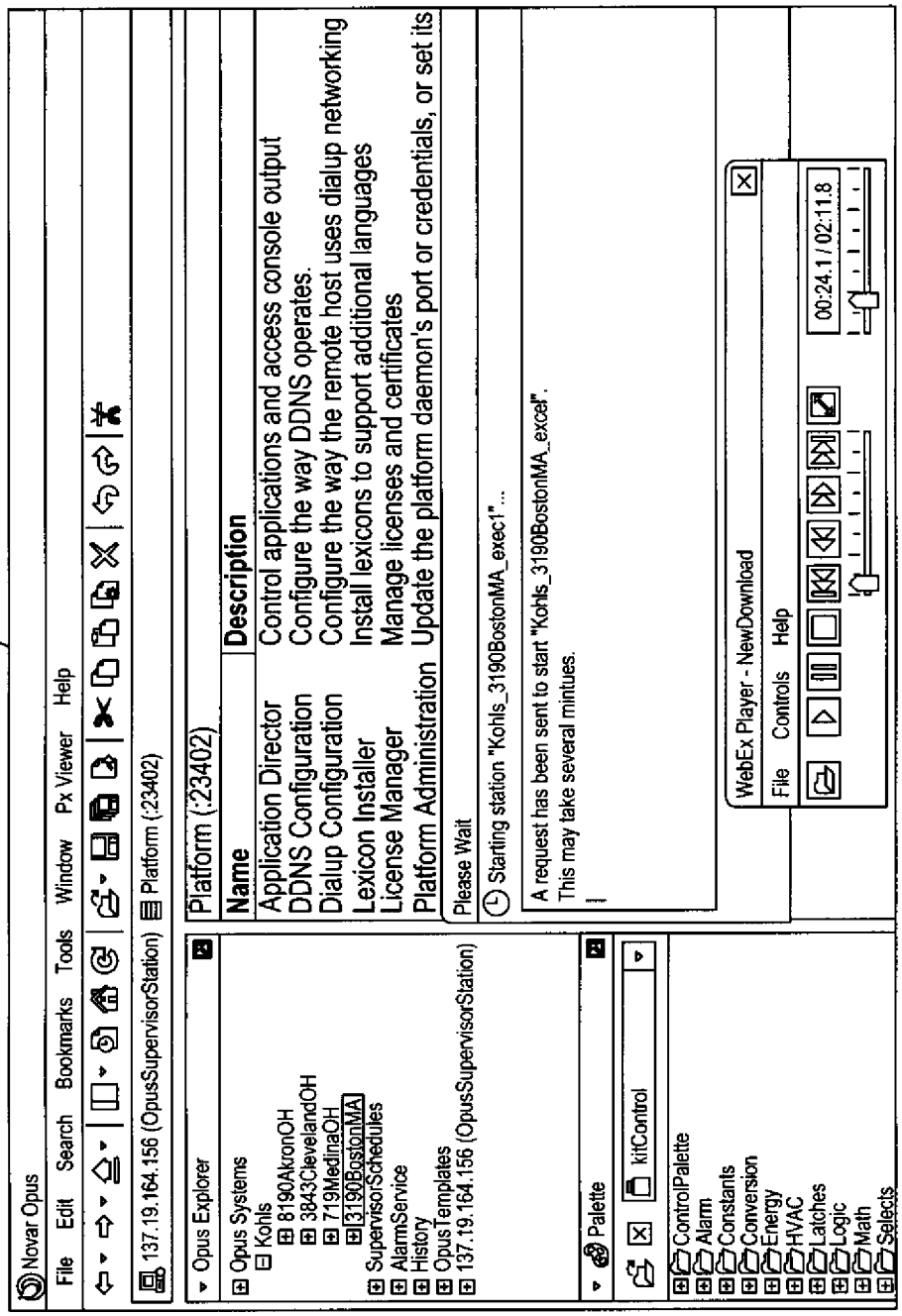
Figure 10:
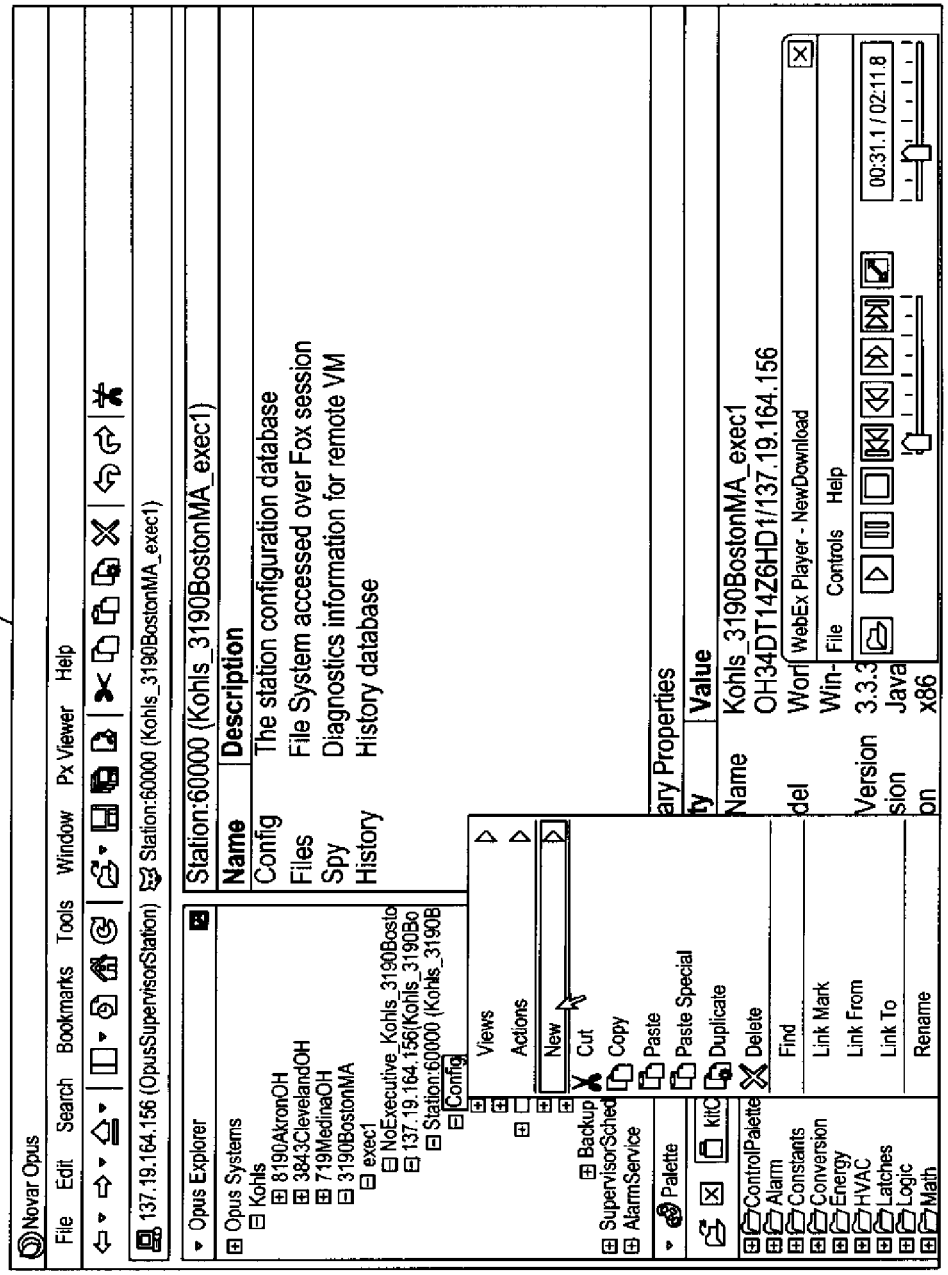
Figure 11:
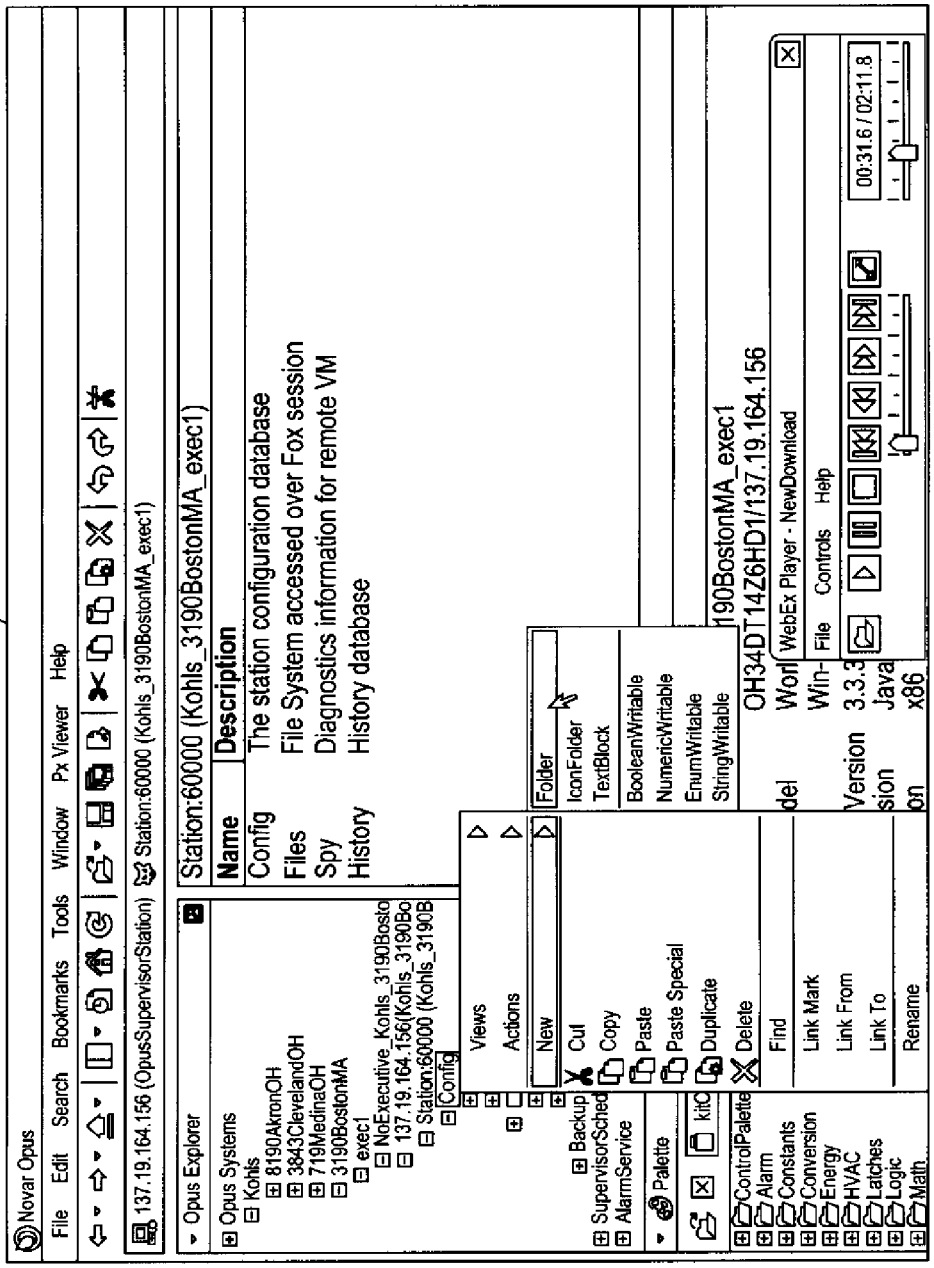
Figure 12:
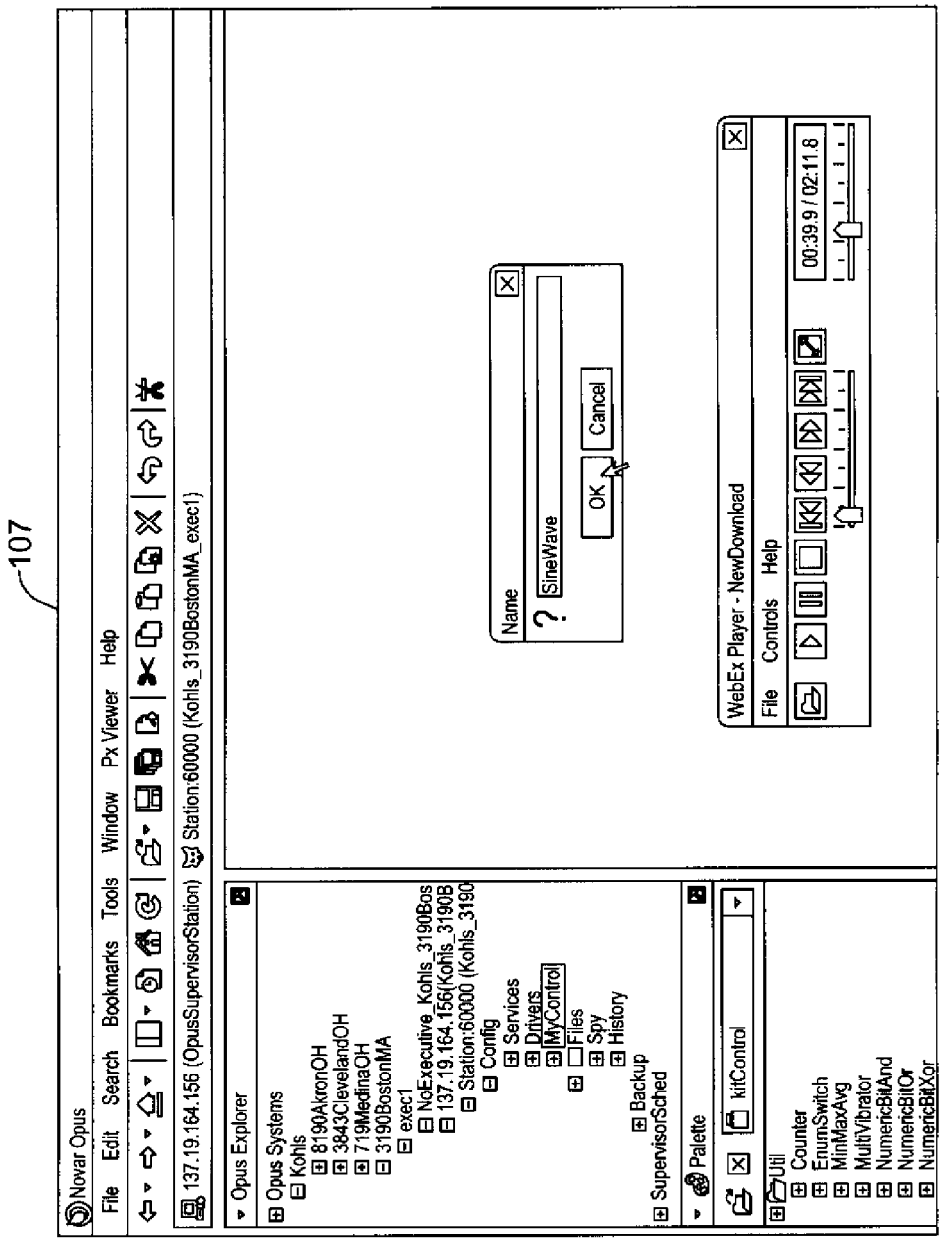
Figure 13:
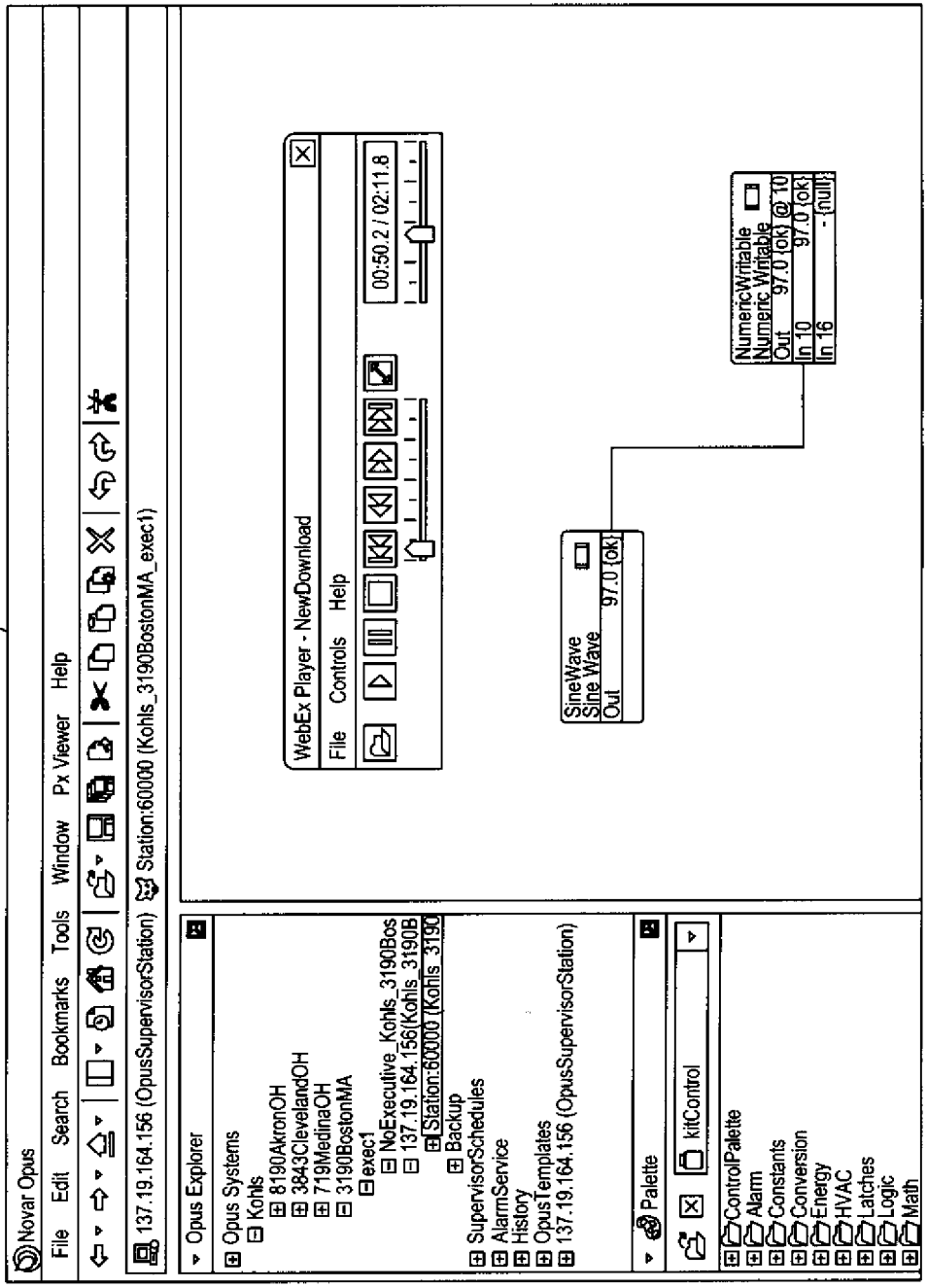
Figure 14:
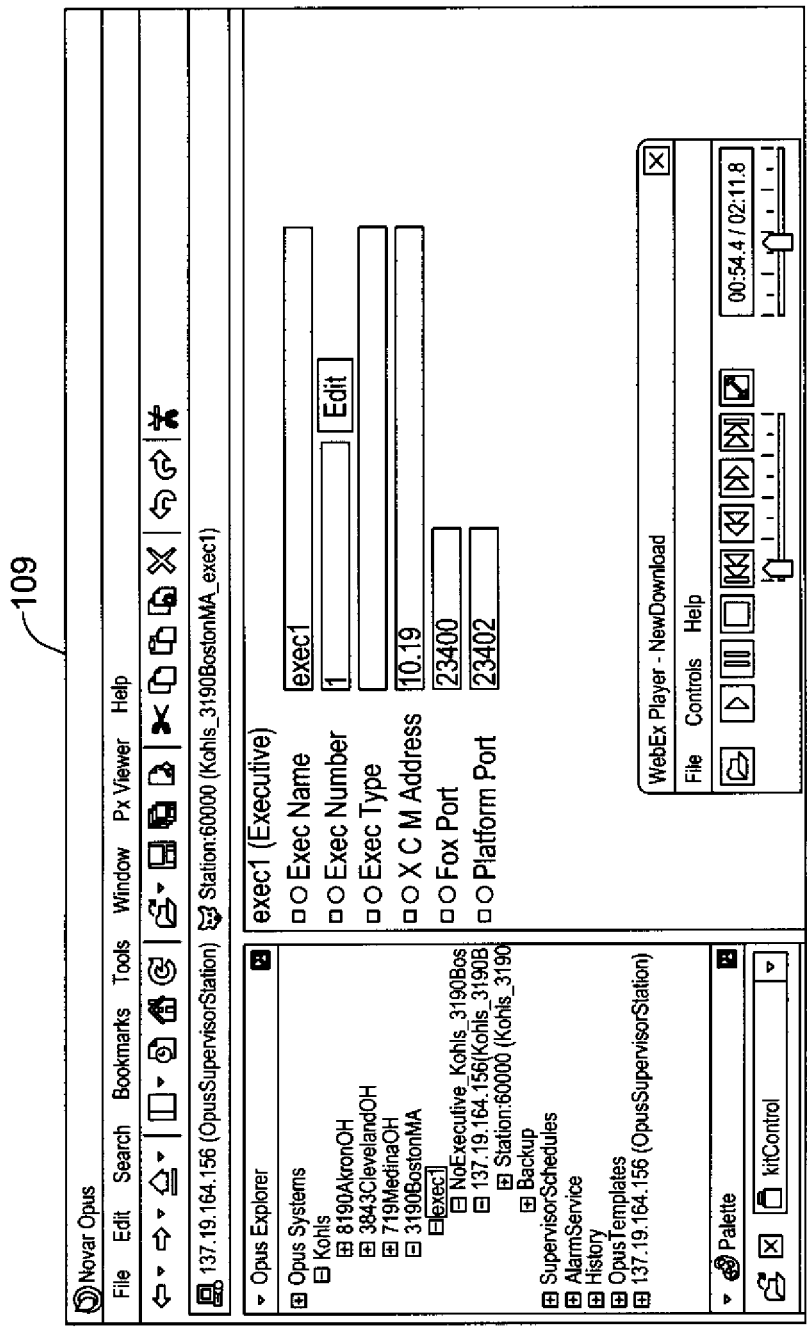
Figure 15:
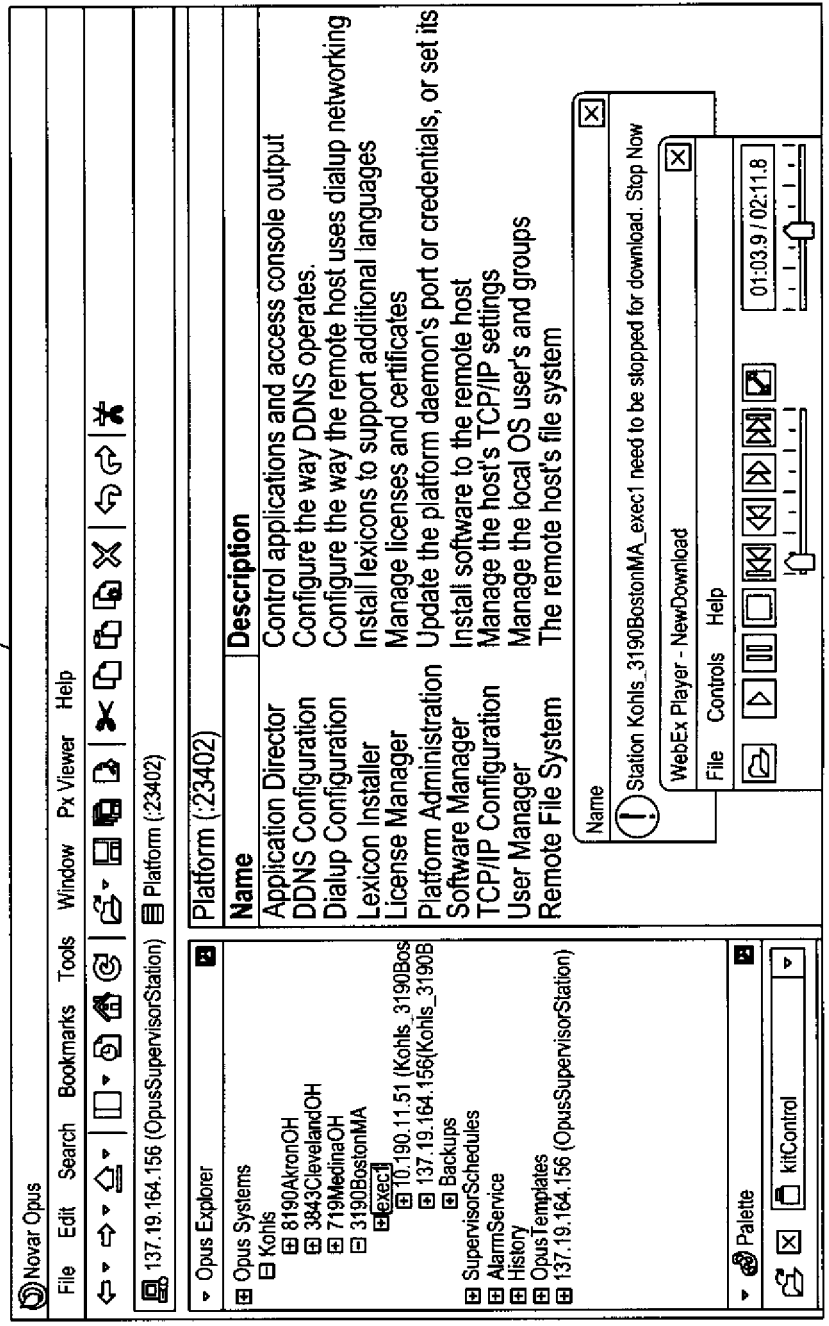
Figure 16:
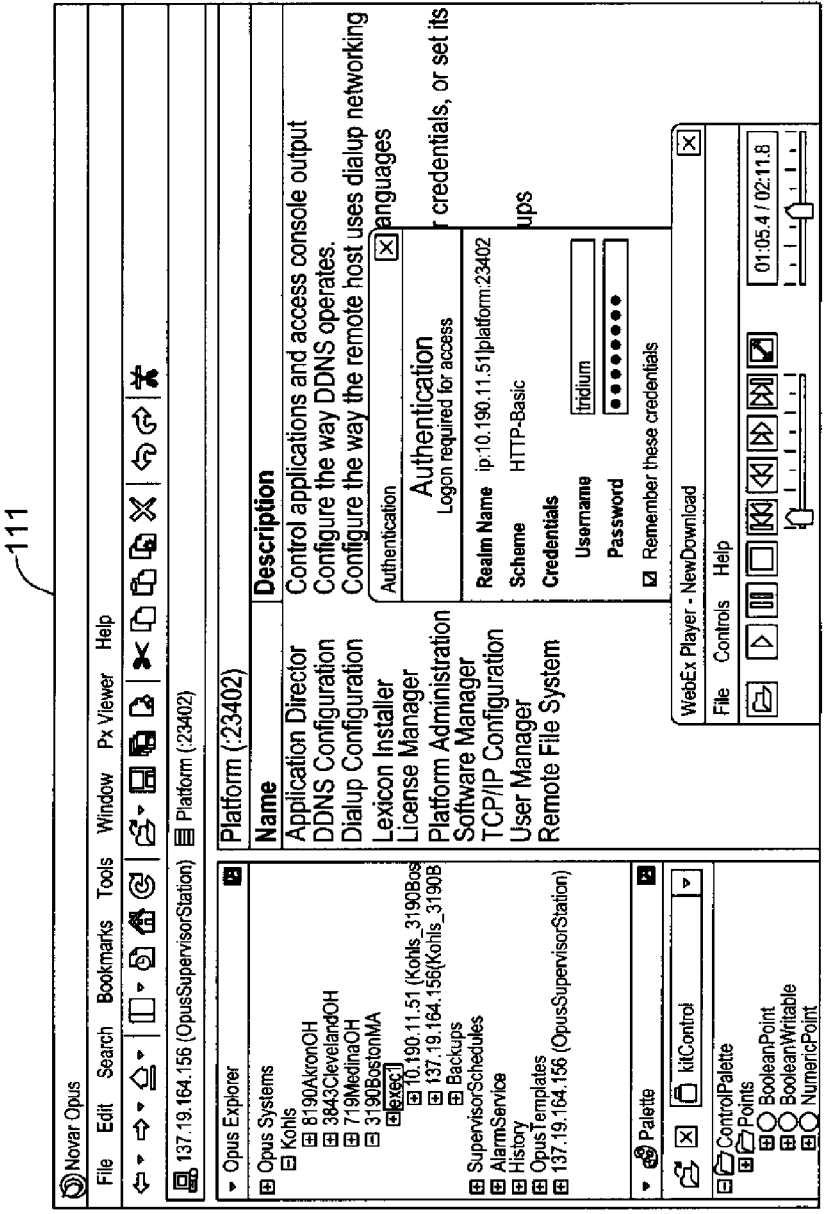
Figure 17:
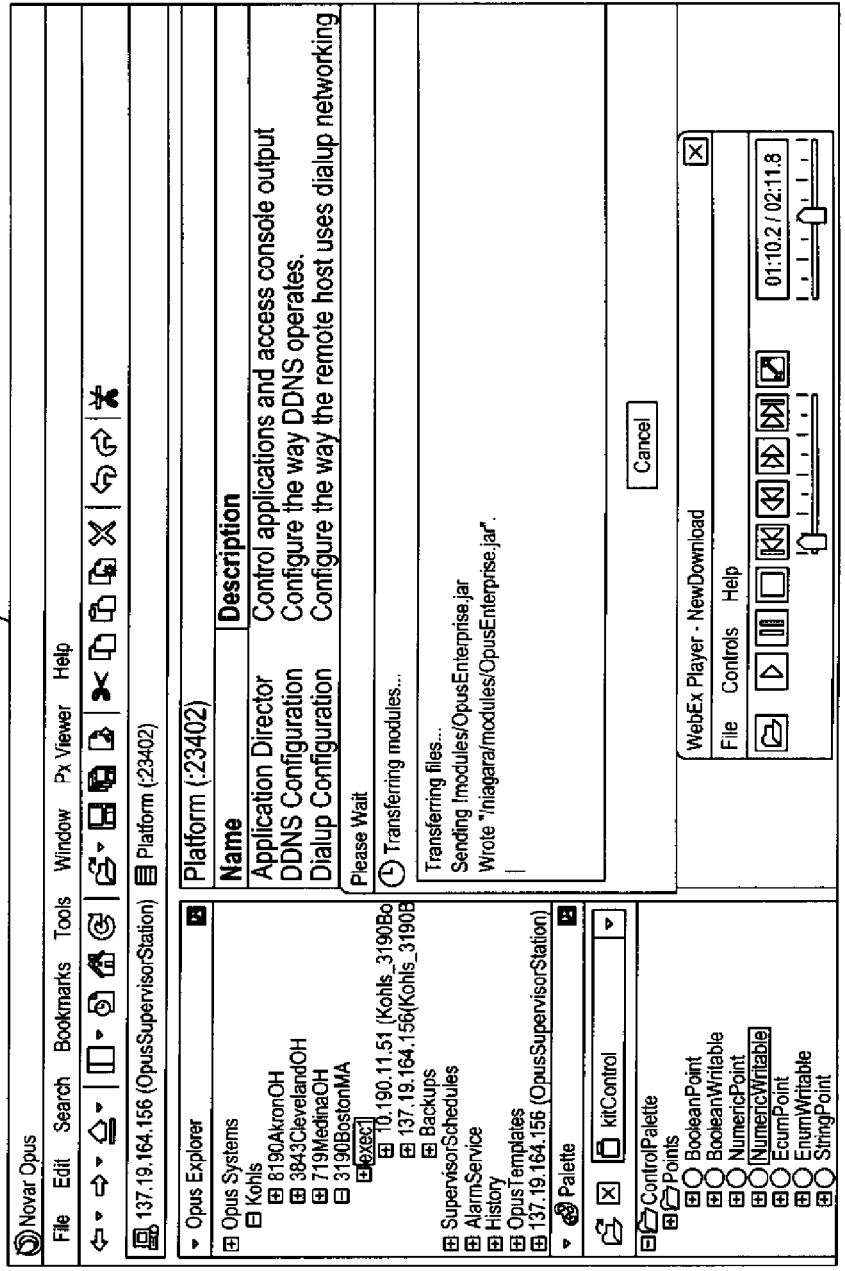
Figure 18:
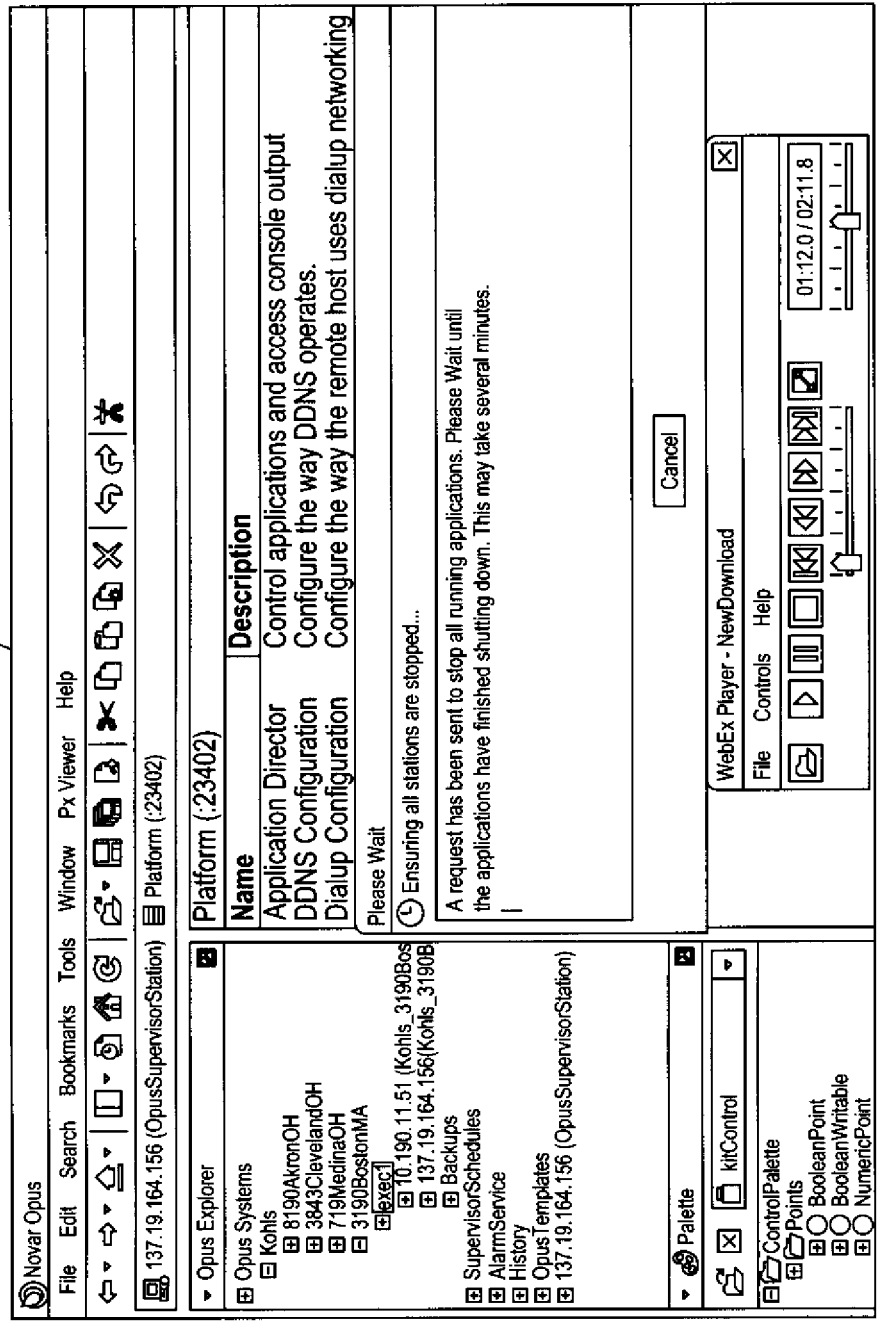
Figure 19:
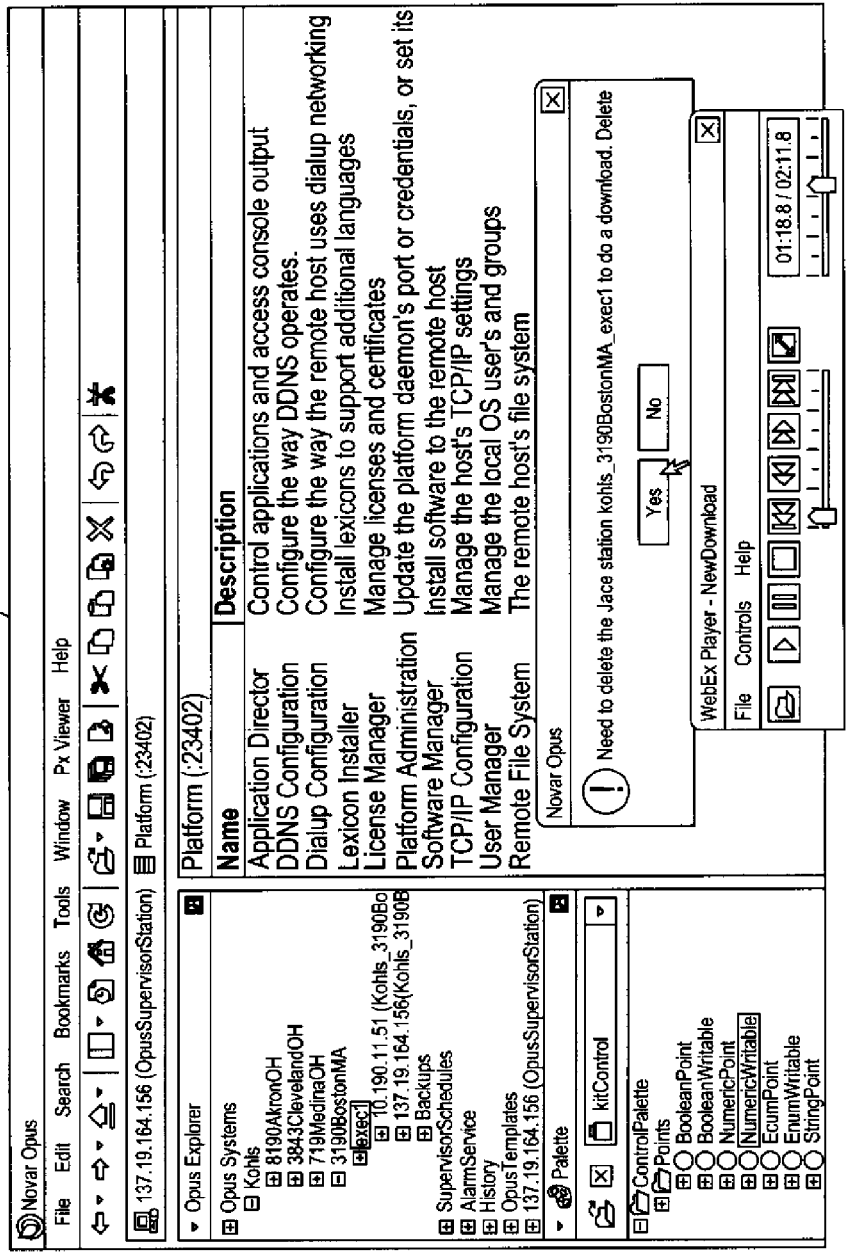
Figure 20:
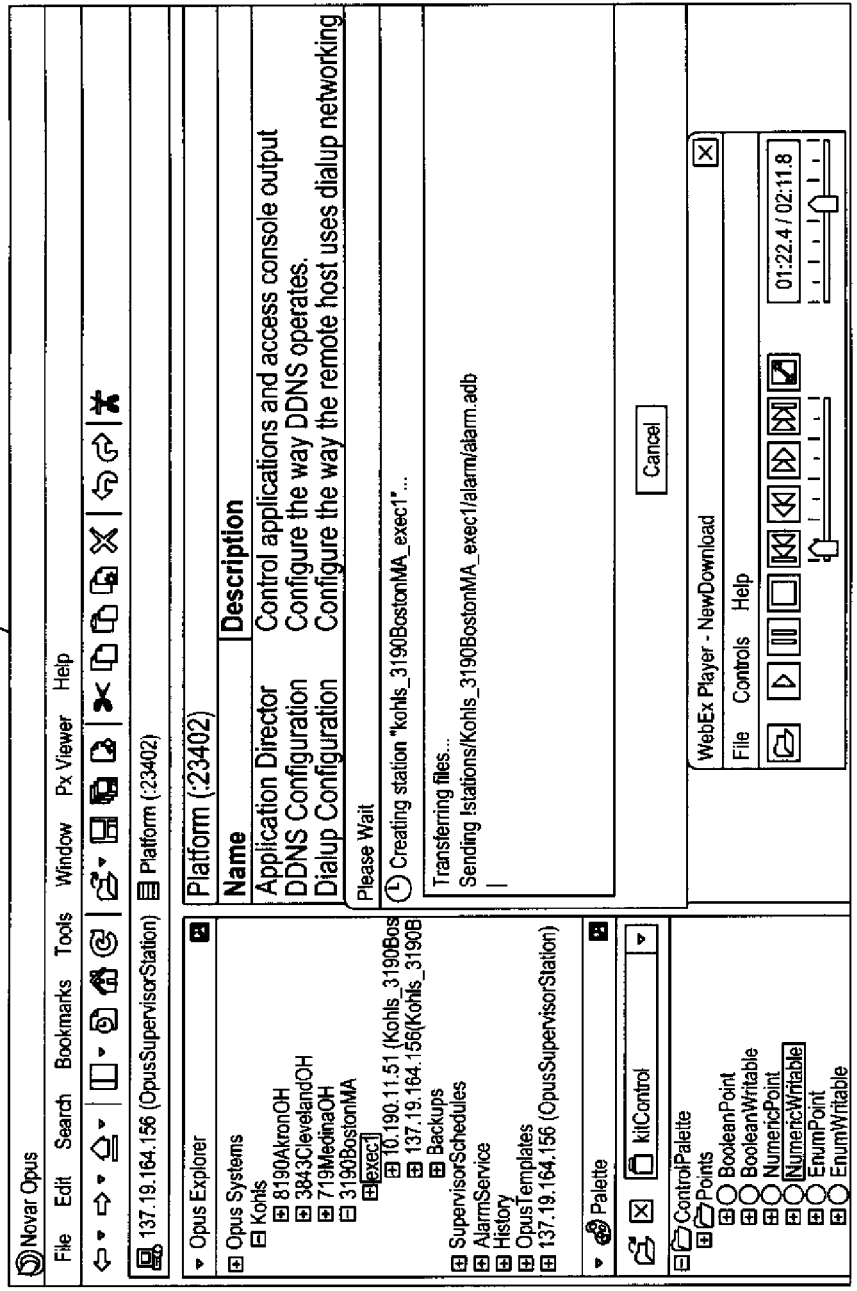
Figure 21:
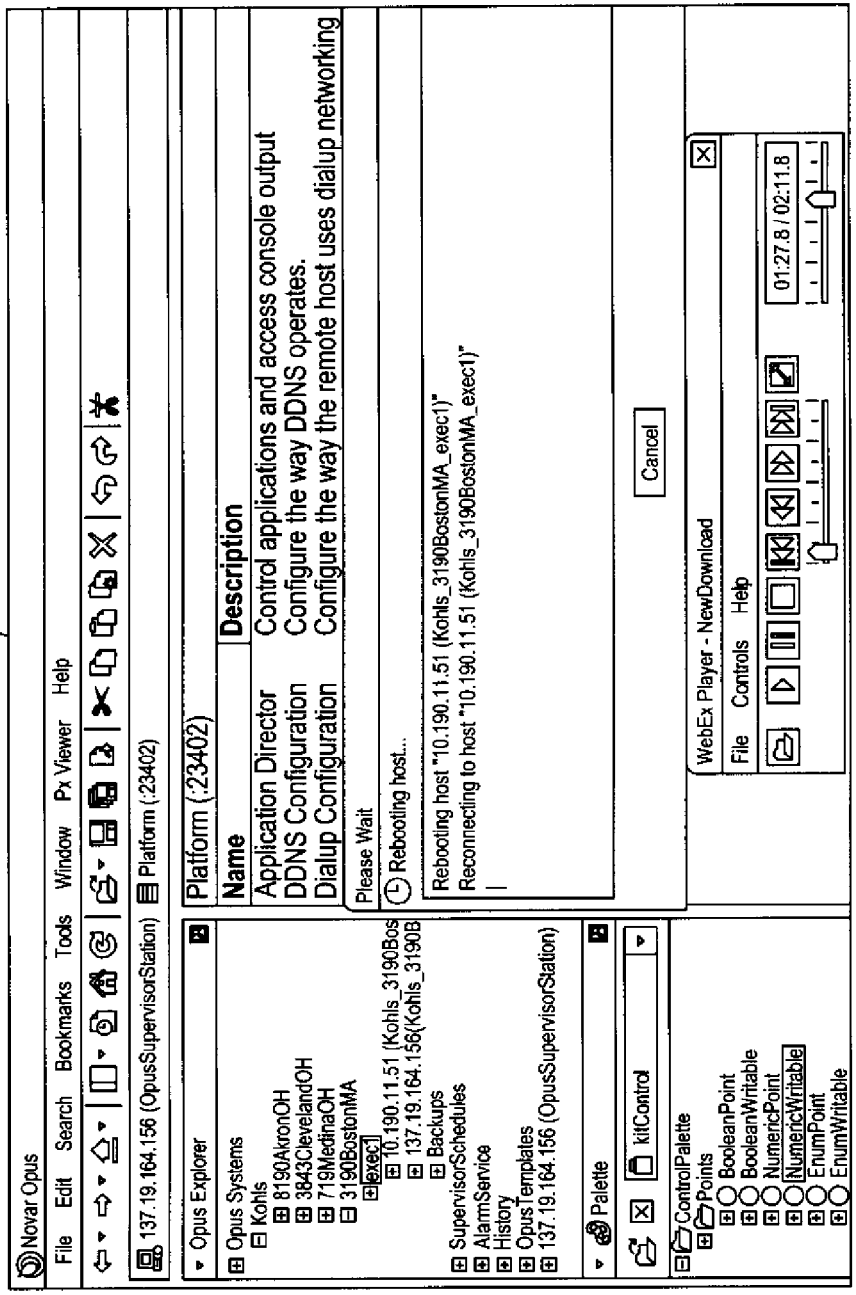
Figure 22:
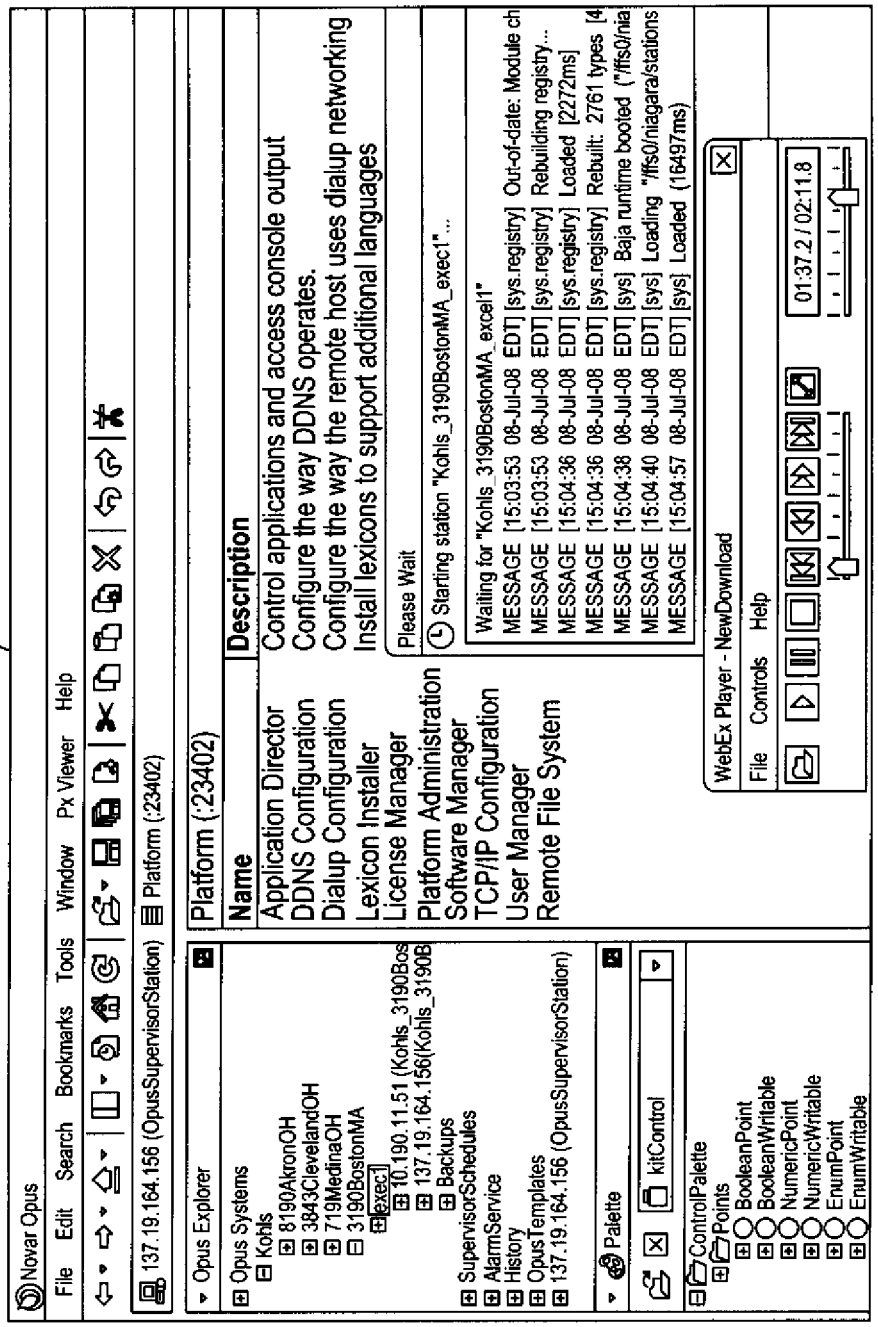
Figure 23:
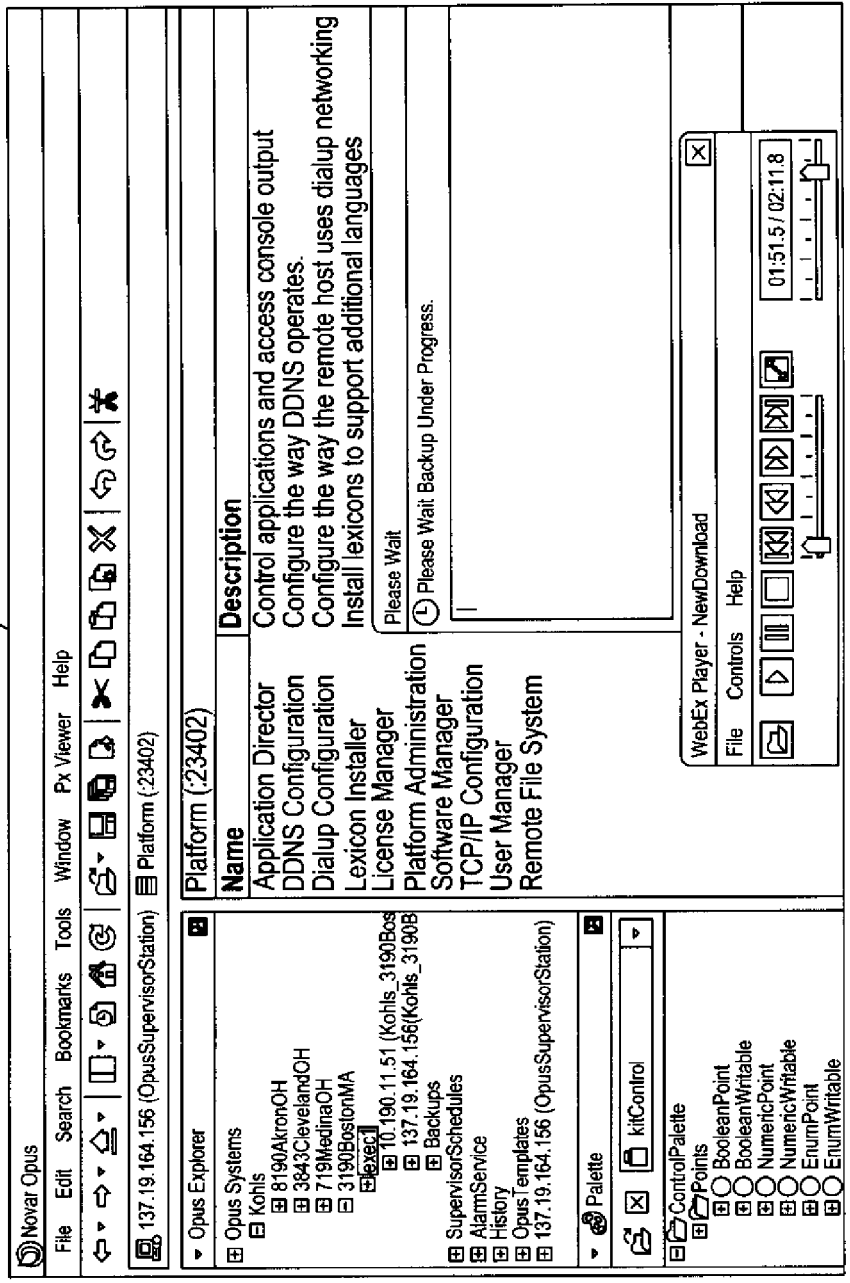
Figure 24:
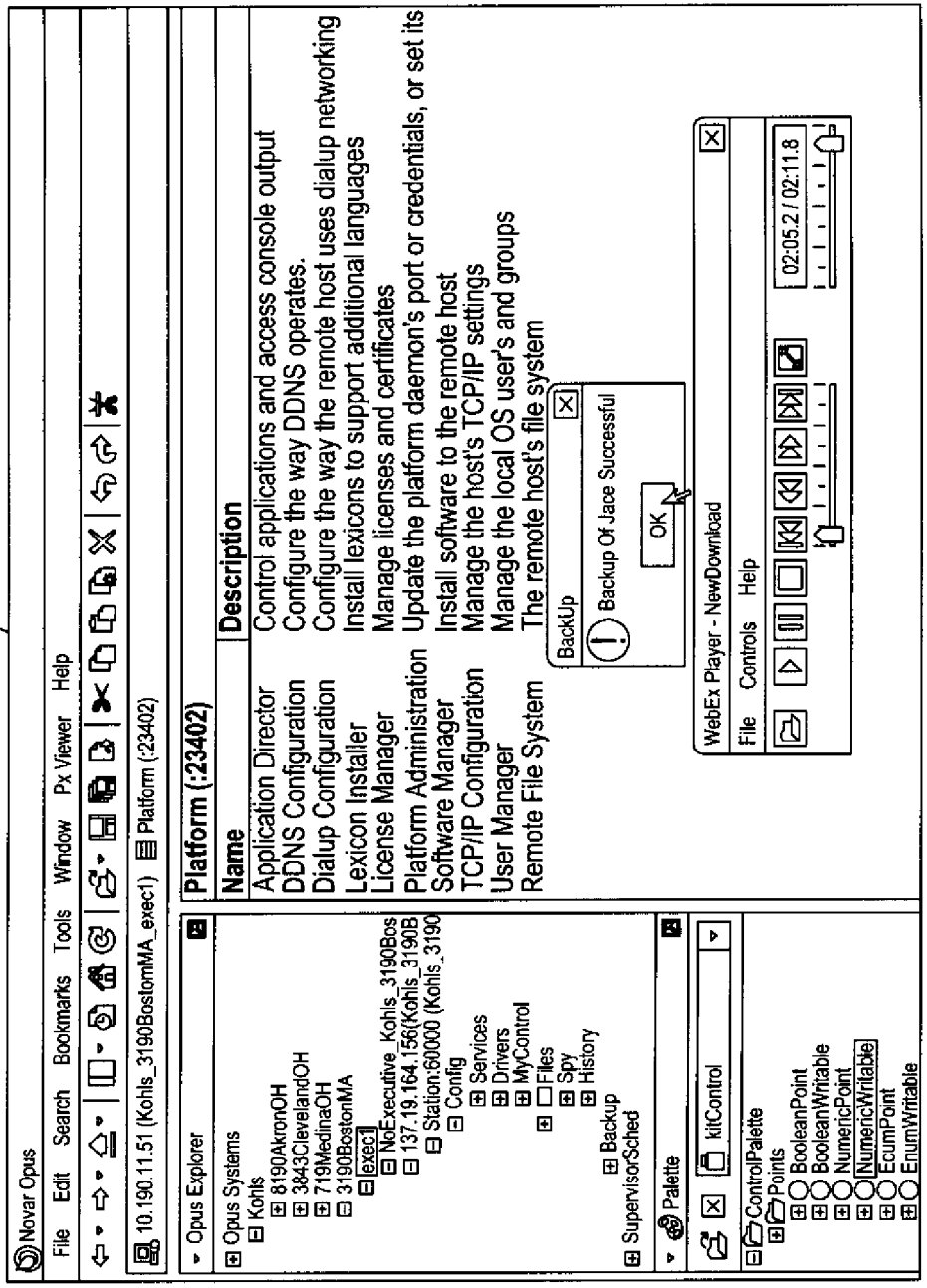
Figure 25:
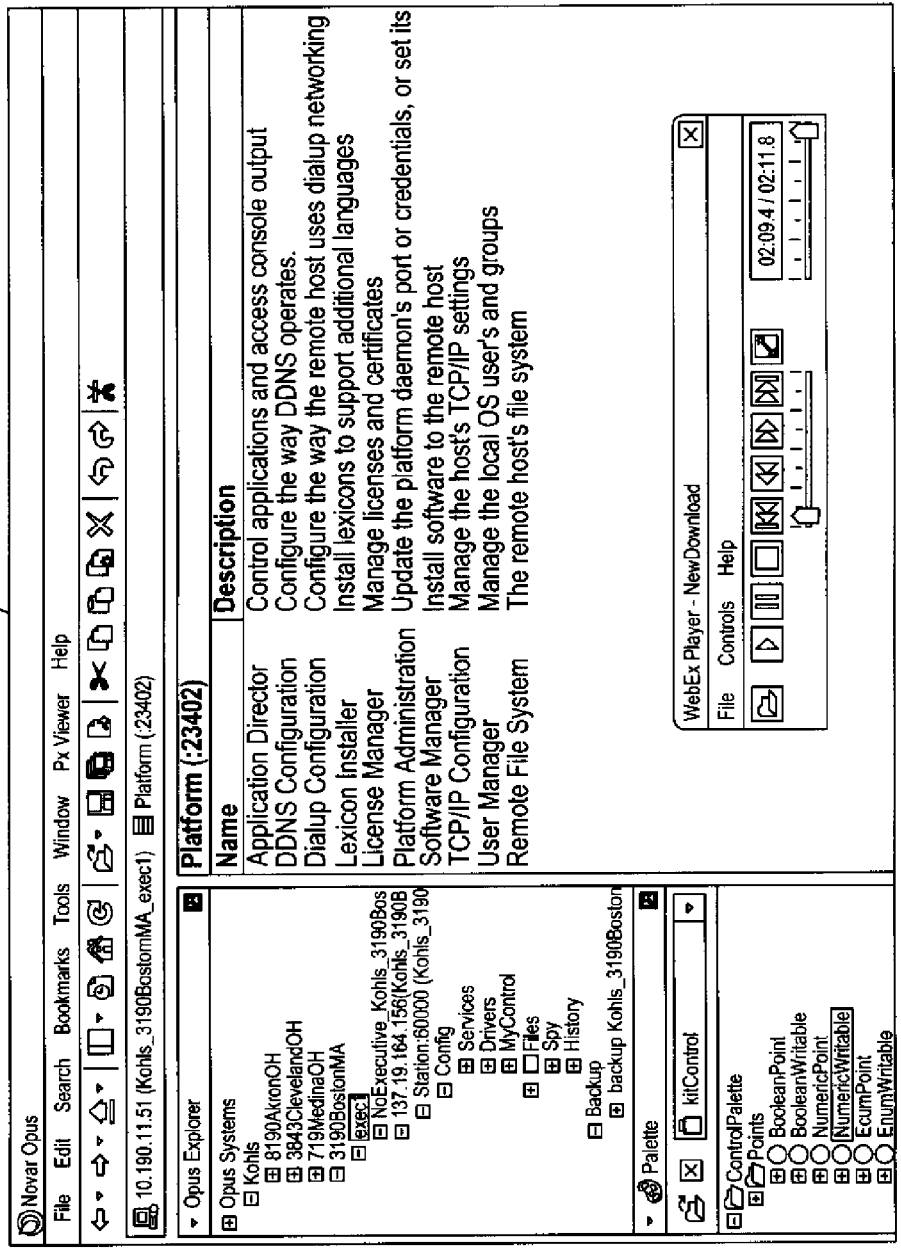

FIGS. 6, 7, 8, 9, 10, 11, 12, 13, 14, 15, 16, 17, 18, 19, 20, 21, 22, 23, 24 and 25 are diagrams of screen shots 101, 102, 103, 104, 105, 106, 107, 108, 109, 110, 111, 112, 113, 114, 115, 116, 117, 118, and 119, respectively, which show portions of a process of the present application. The screen shots are from a demonstration provided by a WebEx™ player with a label 91, as shown in screen shot 101 of FIG. 6, revealing the time of each screen shot taken during the process.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method executable by a processor for offline configuring and offloading, comprising:
creating in a software platform, outside of a site controller, an offline station having a configuration, the offline station created within the software platform, wherein the software platform is a supervisor application and the offline station is a simulated station to be associated with the site controller;
running the offline station within the software platform;
changing the configuration of the offline station; and
providing an address for the offline station;
stopping the offline station;
stopping an existing station at the site controller;
deleting the existing station; and
downloading the configured offline station to the site controller.

2. The method of claim 1, further comprising:
rebooting the site controller; and
starting the offline station at the site controller.

3. The method of claim 2, further comprising backing up the offline station from the site controller to the software platform.

4. The method of claim 1, wherein the software platform is a supervisor.

5. The method of claim 1, wherein the address for the offline station comprises a unique station name.

6. The method of claim 1, wherein the address for the offline station comprises a unique temporary port number.

7. The method of claim 1, further comprising assuring that required jar files are at the site controller prior to downloading the offline station to the site controller.

8. The method of claim 2, further comprising creating an enterprise hierarchy after rebooting the site controller and starting the offline station at the site controller.

9. The method of claim 1, wherein:
the software platform is an OPUS supervisor; and
the site controller is an XCM executive control module controller.

10. An offline configuring system comprising:
a server computer having a software platform; and
an offline station having a configuration on the software platform; and
a site controller; and
wherein:
the offline station is put into a run mode;
changes are made to the configuration;
the offline station is put into a non-run mode;
the site controller is checked to note if an existing station is in a run mode;
if the existing station is in a run mode, then the existing station is put into a non-run mode and eliminated; and
the offline station is downloaded to the site controller.

11. The system of claim 10, wherein:
the site controller is rebooted; and
the offline station is put into the run mode at the site controller.

12. The system of claim 11, wherein the offline station is backed up from the site controller to the software platform.

13. The system of claim 10, wherein prior to the offline station being downloaded to the site controller, the site controller has all needed jar files.

14. The system of claim 11, wherein:
the software platform is a supervisor; and
an enterprise hierarchy is created at the site controller.

15. The system of claim 10, wherein:
the offline station has a unique station name; and
the offline station is assigned a temporary port number.

16. The system of claim 10, wherein the software platform is an OPUS supervisor; and
the site controller is an XCM executive control module controller.

* * * * *